US010157408B2

(12) United States Patent
Varley

(10) Patent No.: US 10,157,408 B2
(45) Date of Patent: Dec. 18, 2018

(54) METHOD, SYSTEMS, AND DEVICES FOR INTEGRATED PRODUCT AND ELECTRONIC IMAGE FULFILLMENT FROM DATABASE

(71) Applicant: Customer Focus Software Limited, Middleton, Manchester (GB)

(72) Inventor: Martin Roy Varley, London (GB)

(73) Assignee: Customer Focus Software Limited, Middleton, Manchester (GB)

( * ) Notice: Subject to any disclaimer, the term of this patent is extended or adjusted under 35 U.S.C. 154(b) by 18 days.

(21) Appl. No.: 15/662,065

(22) Filed: Jul. 27, 2017

(65) Prior Publication Data

US 2018/0033064 A1     Feb. 1, 2018

Related U.S. Application Data

(60) Provisional application No. 62/368,911, filed on Jul. 29, 2016.

(51) Int. Cl.
    *G06Q 30/00*          (2012.01)
    *G06Q 30/06*          (2012.01)
               (Continued)

(52) U.S. Cl.
CPC ... *G06Q 30/0621* (2013.01); *G06F 17/30268* (2013.01); *G06F 17/30271* (2013.01); *G06F 17/30274* (2013.01); *G06F 17/30867* (2013.01); *G06T 11/60* (2013.01); *G06F 3/0482* (2013.01); *G06F 3/04845* (2013.01); *G06T 3/60* (2013.01); *G06T 11/001* (2013.01); *G06T 2210/22* (2013.01)

(58) Field of Classification Search
CPC .......... G06Q 30/0621; G06F 17/30268; G06F 17/30271
USPC ....................................................... 705/26.5
See application file for complete search history.

(56) References Cited

U.S. PATENT DOCUMENTS

| 3,968,719 A | 7/1976 | Sanderson |
|---|---|---|
| 4,014,242 A | 3/1977 | Sanderson |

(Continued)

FOREIGN PATENT DOCUMENTS

| EP | 0642102 | 3/1995 |
|---|---|---|
| WO | WO 2007/030397 | 3/2007 |

(Continued)

OTHER PUBLICATIONS

Notice of Allowance dated Jun. 26, 2015 received in U.S. Appl. No. 14/273,950, in 17 pages.

(Continued)

*Primary Examiner* — Yogesh C Garg
*Assistant Examiner* — Lalith M Duraisamygurusamy
(74) *Attorney, Agent, or Firm* — Knobbe, Martens, Olson & Bear LLP

(57) ABSTRACT

An electronic image (for example, a corporate logo) is superimposed onto one or more product images creating a preview image. This preview can be shown to the consumer before the consumer decides to purchase the product with the corporate logo. The consumer can modify and/or customize the preview image depending on the consumer's desires and goals. Recommendations for modifications on the electronic image can be presented to the consumer.

19 Claims, 18 Drawing Sheets

(51) Int. Cl.
  *G06F 17/30*    (2006.01)
  *G06T 11/60*    (2006.01)
  *G06F 3/0482*   (2013.01)
  *G06T 11/00*    (2006.01)
  *G06T 3/60*     (2006.01)
  *G06F 3/0484*   (2013.01)

(56) References Cited

U.S. PATENT DOCUMENTS

| | | | |
|---|---|---|---|
| 4,832,513 A | 5/1989 | Ikekita | |
| 4,961,154 A | 10/1990 | Pomerantz et al. | |
| 5,237,647 A | 8/1993 | Roberts et al. | |
| 5,442,129 A | 8/1995 | Mohrlok et al. | |
| 5,520,876 A | 5/1996 | Dobler | |
| 5,727,138 A | 3/1998 | Harada | |
| 5,777,254 A | 7/1998 | Fay et al. | |
| 5,817,965 A | 10/1998 | Matsumoto | |
| 5,894,310 A | 4/1999 | Arsenault et al. | |
| 5,895,476 A | 4/1999 | Orr et al. | |
| 5,895,477 A | 4/1999 | Orr et al. | |
| 5,900,567 A | 5/1999 | Fay et al. | |
| 5,952,597 A | 9/1999 | Weinstock et al. | |
| 5,956,737 A | 9/1999 | King et al. | |
| 6,090,027 A | 7/2000 | Brinkman | |
| 6,166,314 A | 12/2000 | Weinstock et al. | |
| 6,276,566 B1 | 8/2001 | Zaksenberg | |
| 6,307,140 B1 | 10/2001 | Iwamoto | |
| 6,313,836 B1 | 11/2001 | Russell, Jr. et al. | |
| 6,336,092 B1 | 1/2002 | Gibson et al. | |
| 6,589,116 B1 | 7/2003 | Grigoriev et al. | |
| 6,737,572 B1 | 5/2004 | Jameson et al. | |
| 6,816,833 B1 | 11/2004 | Iwamoto et al. | |
| 7,006,952 B1 | 2/2006 | Matsumoto et al. | |
| 7,016,841 B2 | 3/2006 | Kenmochi et al. | |
| 7,050,654 B2 | 5/2006 | Lunetta | |
| 7,111,252 B1 | 9/2006 | Harris | |
| 7,191,145 B1 | 3/2007 | Lunetta | |
| 7,266,513 B2 | 9/2007 | Chalmers et al. | |
| 7,391,424 B2 | 6/2008 | Lonsing | |
| 7,447,558 B2 | 11/2008 | Pratt | |
| 7,519,548 B2 | 4/2009 | Hanechak | |
| 7,619,638 B2 | 11/2009 | Walker | |
| 7,835,591 B2 | 11/2010 | Lunetta | |
| 7,899,716 B2 | 3/2011 | Rothman | |
| 8,031,207 B2 * | 10/2011 | Phillips | G06Q 20/105 |
| | | | 235/379 |
| 8,112,721 B2 | 2/2012 | Nakamura | |
| 8,294,713 B1 | 10/2012 | Amanieux | |
| 8,533,580 B1 | 9/2013 | Xu | |
| 8,579,620 B2 | 11/2013 | Wu | |
| 8,600,824 B2 | 12/2013 | Sunkada | |
| 8,628,008 B1 * | 1/2014 | Lee | G06Q 10/10 |
| | | | 235/375 |
| 8,634,089 B2 | 1/2014 | Keane et al. | |
| 8,732,003 B2 | 5/2014 | Keane et al. | |
| 9,087,078 B2 | 7/2015 | Becherer | |
| 9,104,298 B1 | 8/2015 | Varley | |
| 9,330,110 B2 | 5/2016 | Lin | |
| 9,345,264 B1 | 5/2016 | Davila | |
| 2001/0043467 A1 | 11/2001 | Carpenter et al. | |
| 2002/0032573 A1 | 3/2002 | Williams et al. | |
| 2002/0032612 A1 | 3/2002 | Williams et al. | |
| 2002/0036654 A1 | 3/2002 | Evans et al. | |
| 2002/0085230 A1 | 7/2002 | Kitahara et al. | |
| 2002/0161464 A1 | 10/2002 | Weiner | |
| 2002/0185212 A1 | 12/2002 | Schaupp et al. | |
| 2003/0056410 A1 | 3/2003 | Witkowski | |
| 2003/0061217 A1 | 3/2003 | Whittingham et al. | |
| 2003/0076538 A1 | 4/2003 | Whittingham et al. | |
| 2003/0107568 A1 | 6/2003 | Urisaka et al. | |
| 2003/0158786 A1 | 8/2003 | Yaron et al. | |
| 2003/0161014 A1 | 8/2003 | Tobita et al. | |
| 2003/0165326 A1 | 9/2003 | Blair et al. | |
| 2003/0217489 A1 | 11/2003 | Witkowski | |
| 2003/0218766 A1 | 11/2003 | Matsumoto | |
| 2004/0090507 A1 | 5/2004 | Mabbot | |
| 2004/0096601 A1 | 5/2004 | Raymond | |
| 2004/0138905 A1 | 7/2004 | Stinson et al. | |
| 2005/0120010 A1 | 6/2005 | Philpott et al. | |
| 2005/0187106 A1 | 8/2005 | Laney et al. | |
| 2005/0224571 A1 | 10/2005 | Kelley et al. | |
| 2005/0224572 A1 | 10/2005 | Kelley et al. | |
| 2005/0255914 A1 | 11/2005 | McHale et al. | |
| 2005/0264596 A1 | 12/2005 | Little | |
| 2006/0009979 A1 | 1/2006 | McHale et al. | |
| 2006/0075329 A1 | 4/2006 | Sullivan et al. | |
| 2006/0165240 A1 | 7/2006 | Bloom et al. | |
| 2006/0184432 A1 | 8/2006 | Hanechak | |
| 2006/0202042 A1 | 9/2006 | Chu | |
| 2006/0292104 A1 | 12/2006 | Guskey et al. | |
| 2007/0024908 A1 | 2/2007 | Hanechak | |
| 2007/0043579 A1 | 2/2007 | Kent et al. | |
| 2007/0051816 A1 | 3/2007 | Chu | |
| 2007/0090010 A1 | 4/2007 | Crabtree et al. | |
| 2007/0095707 A1 | 5/2007 | Yahiel | |
| 2007/0192210 A1 | 8/2007 | Lunetta | |
| 2008/0114611 A1 | 5/2008 | Nichols | |
| 2008/0168495 A1 | 7/2008 | Roberts et al. | |
| 2008/0213021 A1 | 9/2008 | Silverbrook et al. | |
| 2008/0238916 A1 | 10/2008 | Ghosh et al. | |
| 2008/0268103 A1 * | 10/2008 | Derks | G06Q 30/0212 |
| | | | 426/87 |
| 2009/0164339 A1 | 6/2009 | Rothman | |
| 2009/0202757 A1 | 8/2009 | Fujio | |
| 2009/0256817 A1 | 10/2009 | Perlin et al. | |
| 2009/0276089 A1 | 11/2009 | Bartholomew | |
| 2009/0298017 A1 | 12/2009 | Boerjes et al. | |
| 2010/0073198 A1 | 3/2010 | Wegner et al. | |
| 2010/0211885 A1 | 8/2010 | Berg et al. | |
| 2010/0245387 A1 | 9/2010 | Bachelder et al. | |
| 2010/0321405 A1 | 12/2010 | MacInnes et al. | |
| 2011/0050848 A1 | 3/2011 | Rohaly et al. | |
| 2011/0228995 A1 | 9/2011 | Batman et al. | |
| 2011/0282476 A1 | 11/2011 | Hegemier | |
| 2012/0036046 A1 | 2/2012 | Anderson | |
| 2012/0166276 A1 * | 6/2012 | Chitnis | G06F 17/30864 |
| | | | 705/14.49 |
| 2012/0220494 A1 | 8/2012 | Samuels et al. | |
| 2012/0245841 A1 | 9/2012 | Spindler et al. | |
| 2012/0245848 A1 | 9/2012 | Spindler et al. | |
| 2012/0282476 A1 | 11/2012 | Lu | |
| 2013/0073336 A1 | 3/2013 | Heath | |
| 2013/0073374 A1 | 3/2013 | Heath | |
| 2013/0073388 A1 | 3/2013 | Heath | |
| 2013/0076909 A1 | 3/2013 | Marti et al. | |
| 2013/0087620 A1 | 4/2013 | Sharma et al. | |
| 2013/0091445 A1 | 4/2013 | Treadway et al. | |
| 2013/0127980 A1 | 5/2013 | Haddick et al. | |
| 2013/0215148 A1 | 8/2013 | Antonyuk et al. | |
| 2013/0278631 A1 | 10/2013 | Border et al. | |
| 2014/0002342 A1 | 1/2014 | Fedorovskaya et al. | |
| 2014/0002644 A1 | 1/2014 | Fedorovskaya et al. | |
| 2014/0003648 A1 | 1/2014 | Fedorovskaya et al. | |
| 2014/0003652 A1 | 1/2014 | Fedorovskaya et al. | |
| 2014/0003716 A1 | 1/2014 | Fedorovskaya et al. | |
| 2014/0003737 A1 | 1/2014 | Fedorovskaya et al. | |
| 2014/0006129 A1 | 1/2014 | Heath | |
| 2014/0143082 A1 * | 5/2014 | Larson | G06Q 30/0621 |
| | | | 705/26.5 |
| 2014/0214582 A1 | 7/2014 | Gobeyn | |
| 2014/0267273 A1 | 9/2014 | Kontkanen | |
| 2014/0370158 A1 | 12/2014 | Speck et al. | |
| 2015/0356119 A1 | 12/2015 | Spielberg | |
| 2016/0342860 A1 | 11/2016 | Osipov | |
| 2017/0178371 A1 * | 6/2017 | Gonzales, Jr. | G06T 11/60 |

FOREIGN PATENT DOCUMENTS

| | | |
|---|---|---|
| WO | WO 2012/021526 A1 | 2/2012 |

(56) References Cited

FOREIGN PATENT DOCUMENTS

| WO | WO 2015/128707 A1 | 9/2015 |
| WO | WO 2015/179757 A1 | 11/2015 |

OTHER PUBLICATIONS

U.S. Appl. No. 14/788,283, filed Jun. 30, 2015, including its prosecution history, the cited references, and the Office Actions therein.

* cited by examiner

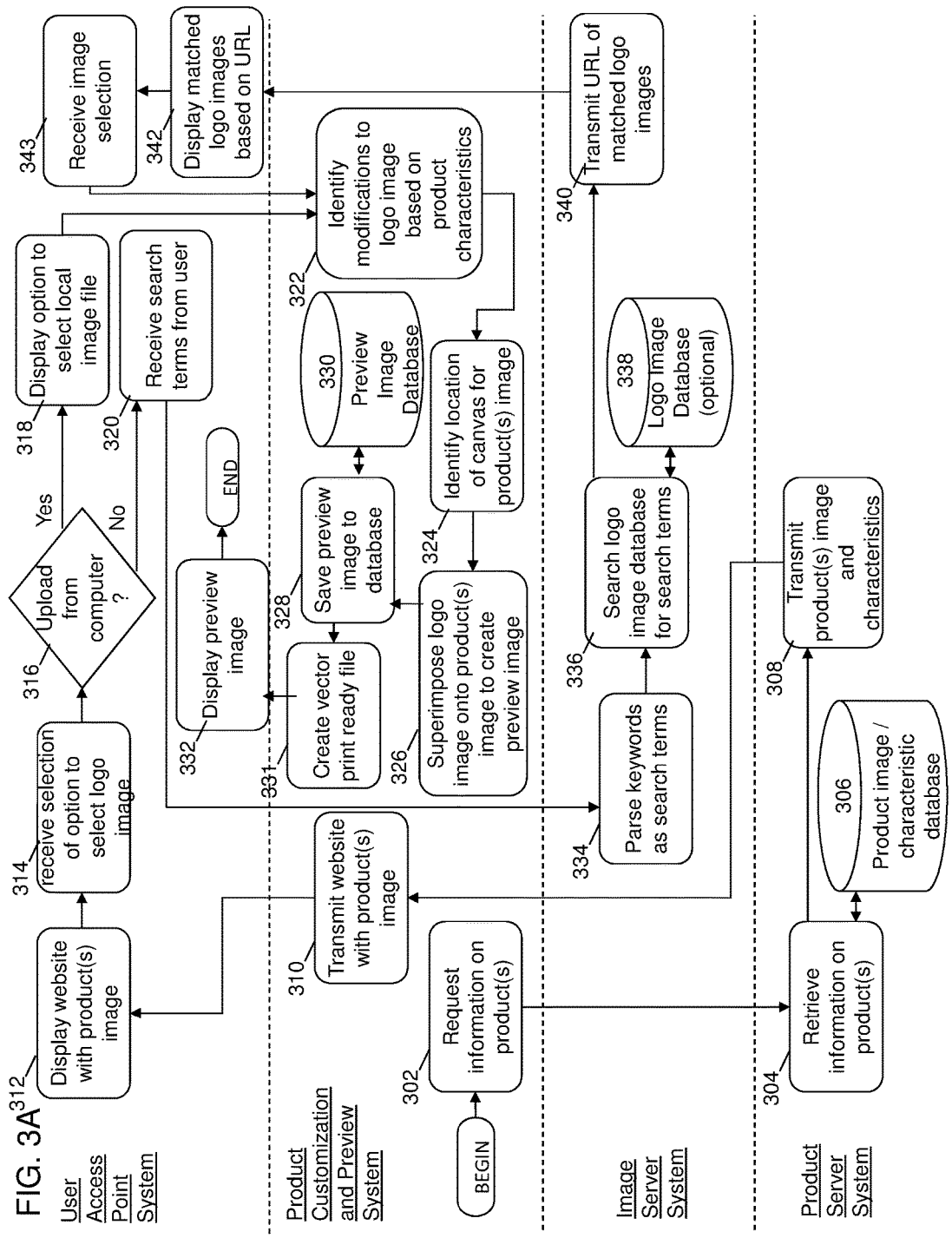

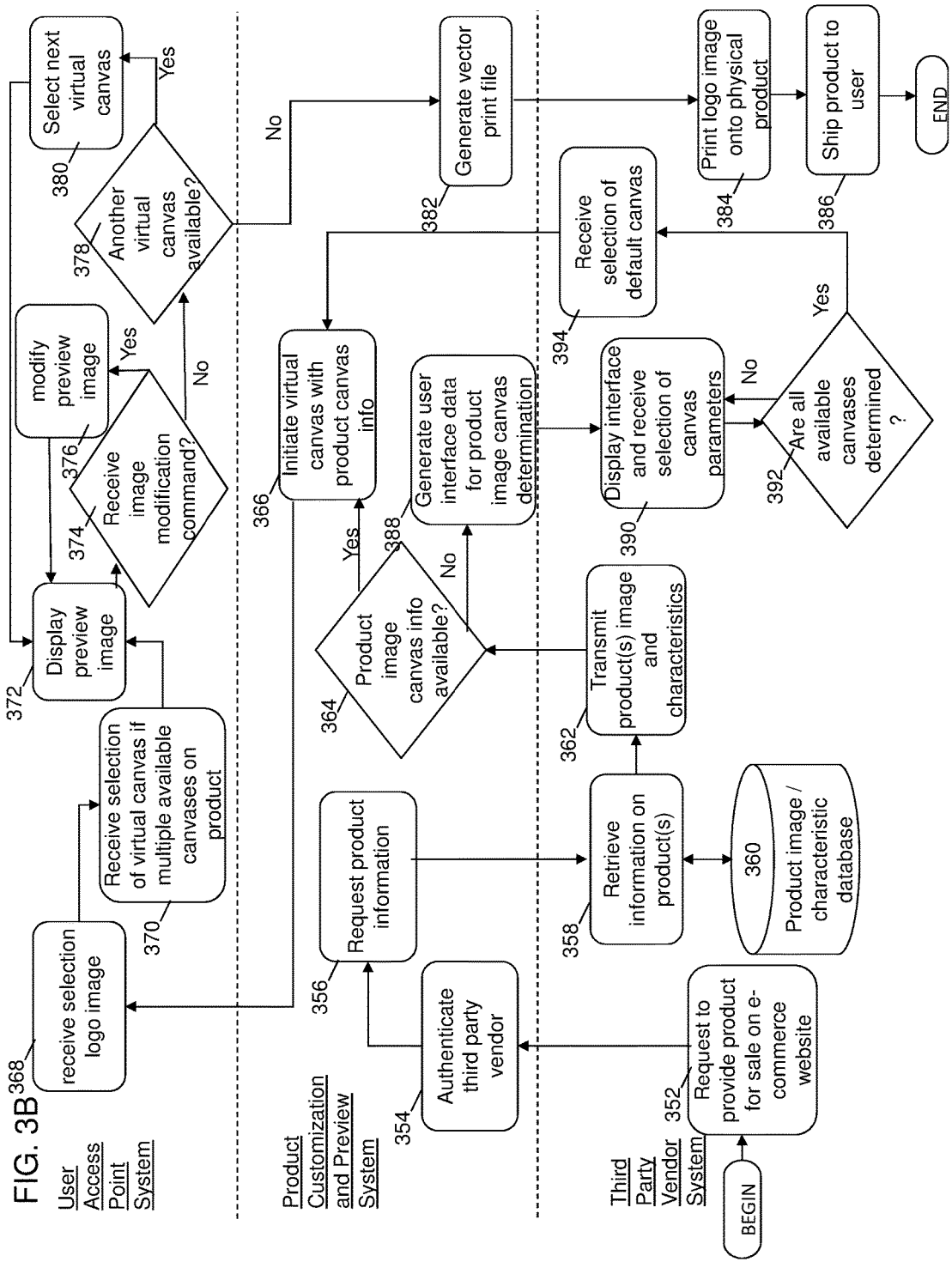

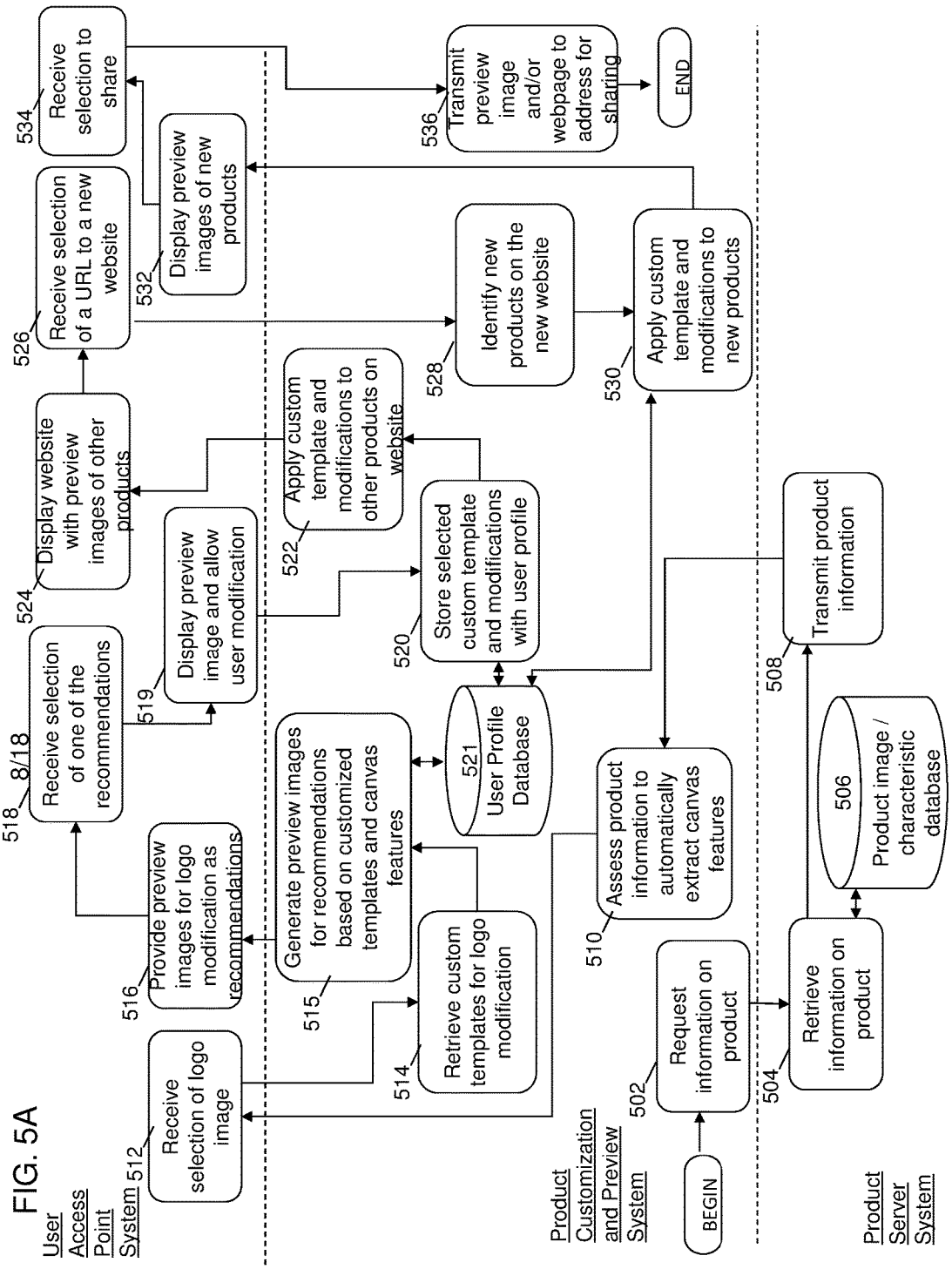

METHOD, SYSTEMS, AND DEVICES FOR INTEGRATED PRODUCT AND ELECTRONIC IMAGE FULFILLMENT FROM DATABASE

CROSS REFERENCE TO RELATED APPLICATIONS

This application claims the benefit of U.S. Provisional Patent Application No. 62/368,911, filed on Jul. 29, 2016, which is hereby incorporated herein by reference in its entirety for all purposes, including specifically but not limited to the systems and methods relating to integrated product and electronic image fulfillment from a database.

BACKGROUND

Field

The embodiments disclosed herein generally relate to systems and methods for providing and/or improving a product customization and preview system, and more particularly to generating, managing, customizing, modifying, storing, automatically changing, and manufacturing products integrated with electronic image fulfillment.

SUMMARY

Various embodiments described herein disclose an electronic image (for example, a corporate logo) that is superimposed onto one or more product images creating a preview image. This preview can be shown to the consumer before the consumer decides to purchase the product with the corporate logo. The consumer can modify and/or customize the preview image depending on the consumer's desires and goals. Recommendations for modifications on the electronic image can also be presented to the consumer.

In some embodiments, a computer-implemented method for processing a preview image based on characteristics of a canvas of a product and characteristics of an electronic image comprises: accessing, by a computer system, information on a product from a product characteristic database, wherein the information on the product comprises a color of the product; retrieving, by the computer system, a product image from a product image database, wherein the product image comprises metadata indicative of a perspective of the product image and at least one characteristic of a canvas of the product; transmitting, by the computer system, first display data to a user device for displaying the product image; receiving, by the computer system, a request from the user device to superimpose a logo onto the canvas of the product image; receiving, by the computer system, one or more keywords from a user device; utilizing, by the computer system, an API of a third party engine to search for one or more electronic images associated with the one or more keywords by transmitting the one or more keywords to the third party search engine via the API; receiving, by the computer system, search results from the third party search engine via the API, wherein the search results comprises the one or more electronic images; transmitting, by the computer system, the search results associated with the one or more keywords to the user device; receiving, by the computer system, a user selection of the logo among the one or more electronic images from the search results; accessing, by the computer system, the logo from an electronic image database; automatically modifying, by the computer system, the accessed logo, wherein modifying the accessed logo comprises: modifying a background of the accessed logo based on the color of the product, wherein the modification of the background comprises applying a color filter to a background color; stretching pixels of the accessed logo based on the at least one characteristic on the canvas of the product, wherein the at least one characteristic comprises a curvature of the canvas of the product; and modifying the accessed logo based on the perspective of the product image, wherein modifying the accessed logo based on the perspective of the product image comprises rotating the accessed logo to match with a rotation of the product image; superimposing, by the computer system, the modified logo onto the product image to create a preview image; and transmitting, by the computer system, second display data to the user device for displaying the preview image, wherein the computer system comprises a computer processor and an electronic storage medium.

In some embodiments, the method further comprises: receiving, by the computer system, a request for a third-party website; accessing, by the computer system, a list of product images associated with the third-party website; automatically modifying, by the computer system, the accessed logo for each of the list of product images associated with the third-party website, wherein modifying the logo for each of the list of product images associated with the third-party website comprises: changing the background of the accessed logo for each of the list of product images; stretching the accessed logo for each of the list of product images based on the at least one characteristic on the canvas for each of the list of product images, wherein the at least one characteristic comprise a curvature of the canvas; and modifying the accessed logo for each of the list of product images based on the perspective of the product image; superimposing, by the computer system, the modified logo onto each of the list of product images to create preview images associated with the third-party website; and transmitting, by the computer system, third display data to the user device for displaying the preview images associated with the third-party website.

In some embodiments, the method further comprises: receiving, by the computer system, one or more keywords from the user device; transmitting, by the computer system, search results associated with the one or more keywords received by the user device; and receiving, by the computer system, a user selection of the logo.

In some embodiments, the method further comprises: receiving, by the computer system, an image file that is uploaded from the user device; and storing, by the computer system, the image file into the electronic image database, wherein accessing, by the computer system, the logo from an electronic image database comprises accessing the uploaded image file.

In some embodiments, the logo comprises a company logo and/or company title.

In some embodiments, retrieving, by the computer system, a product image from a product image database comprises: accessing a URL, wherein the URL comprises an electronic address to at least the product image; retrieve the product image from the URL; and store the product image to the electronic image database.

In some embodiments, the electronic image database comprises URLs to product images.

In some embodiments, automatically modifying, by the computer system, the accessed logo is based on a user profile that comprises previous user modifications.

In some embodiments, automatically modifying, by the computer system, the accessed logo is performed based on a preconfigured template.

In some embodiments, automatically modifying, by the computer system, the accessed logo is based on a user profile that further comprises automatically cropping and rotating the accessed logo based on the canvas of the product.

The computer-implemented method of claim 1, the system comprises: one or more computer readable storage devices configured to store a plurality of computer executable instructions; and one or more hardware computer processors in communication with the one or more computer readable storage devices and configured to execute the plurality of computer executable instructions in order to: access a product image from a product image database, wherein the product image comprises metadata indicative of a characteristic of a product; access a logo from an electronic image database, the electronic image to be superimposed onto the product image; generate a first preview image by superimposing the logo onto the product image to generate the first preview image; generate a second preview image by modifying the logo via a first modification type and superimposing the modified electronic image to generate the first preview image, wherein the first modification type comprises removing the edges of the logo; generate a third preview image by modifying the logo via a second modification type and superimposing the modified logo to generate the first preview image, wherein the second modification type comprises removing a background of the logo; transmit the first preview image, the second preview image, and the third preview image to a user device to present recommendations to a user for selection; receive a selection of a preview image from the user device; and generate a preview image for a different product image based on the modification type associated with the selected preview image.

The computer-implemented method of claim 1, wherein the system further configured to: create a vector print ready file that can be used by a printer to print the logo onto the product.

The computer-implemented method of claim 1, wherein the vector print ready file provides instructions for the type of ink to use when printing the logo ono the product.

The computer-implemented method of claim 1, wherein the vector print ready file comprises instructions for a 3D printer to print the product with the logo printed on the canvas of the product.

The computer-implemented method of claim 1, wherein the system further configured to: receive a user request to share the preview image to another user; and transmitting the preview image to the another user.

In some embodiments, a computer-implemented method for processing a preview image of an electronic image superimposed on a product image comprises: retrieving, by a computer system, a product image from a product image database, wherein the product image comprises metadata indicative of a characteristic of a product; receiving, by the computer system, one or more keywords from a user device; utilizing, by the computer system, an API of a third party search engine by transmitting the one or more keywords to the third party search engine via the API; receiving, by the computer system, search results from the third party search engine; transmitting, by the computer system, the search results associated with the one or more keywords to the user device; receiving, by the computer system, a user selection of a logo among the search results; accessing, by the computer system, the logo from an electronic image database; superimposing, by the computer system, the logo onto the product image to create a preview image; and transmitting, by the computer system, the preview image to the user device for displaying the preview image, wherein the computer system comprises a computer processor and an electronic storage medium.

In some embodiments, the preview image comprises a rasterized image file.

In some embodiments, the preview image comprises a vectorized image file.

In some embodiments, the search results are received via API.

In some embodiments, the method further comprises offering, by the computer system, the product with the logo to the user for sale.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

A better understanding of the devices and methods described herein will be appreciated upon reference to the following description in conjunction with the accompanying drawings.

FIG. 3A is a flowchart depicting an embodiment of a method for creating a preview image and a vector print ready file.

FIG. 3B is a flowchart depicting an embodiment of a method for creating preview images of third party vendor product images.

FIG. 5A depicts an embodiment of making recommendations of modifications to a user and propagating the selected modification to product images on other websites.

DETAILED DESCRIPTION

Figure 1:
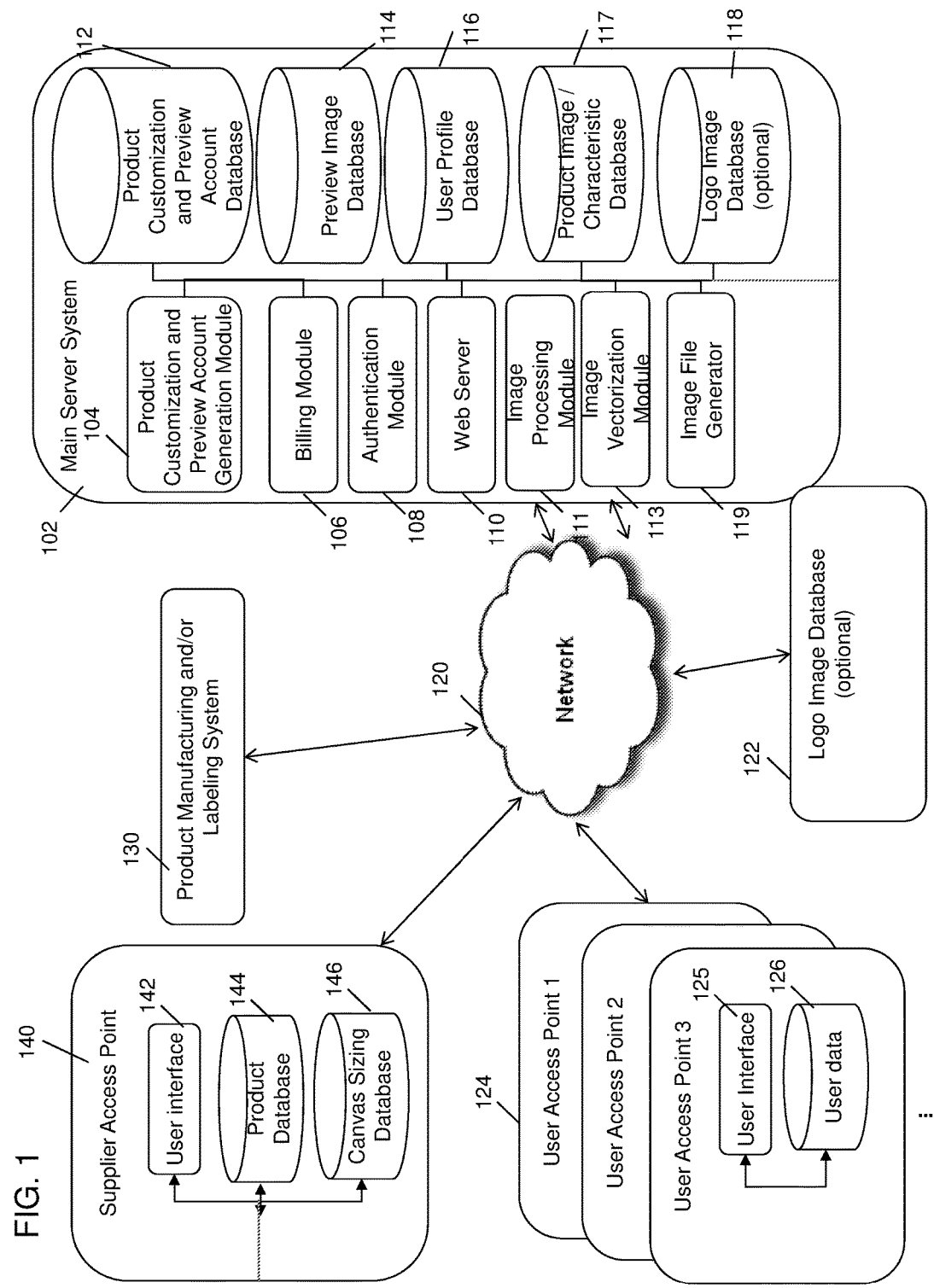
FIG. 1 is an embodiment of a schematic diagram illustrating an embodiment of a product customization and preview account generation and management system.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Some embodiments of the present disclosure comprise a system for selecting a logo image, modifying the logo image, superimposing the logo image onto a product image creating a preview image, and displaying the preview image to a browser interface. The user can search for logo on a third-party website using an API by entering in keywords for the third-party website to search for, and the third-party website can return search results of electronic images that the user can select as the logo to be superimposed onto the product image. The user can also select a file located in a directory on a personal computer or electronic storage as the logo.

In some embodiments, the logo can be modified automatically, semi-automatically, manually, and/or a combination. For example, the logo can be automatically modified to remove the background color and the user can further add text or a tilt to the image. In some embodiments, several recommendations for modification can be presented to the user for the user to select. For example, a logo superimposed onto the product without modification, a logo with the frame color of the logo removed, and a logo with the frame and background color removed can be selected for the user to choose. The logo can be automatically modified based on characteristics of the product, such as dimensions of the product, the location of the canvas where the logo can be placed, the curvature of the product, the perspective of the product image, and the like. The modifications can comprise stretching the image, rotating or cropping the image, changing the size of the image, removing a frame color or background color of an image, adding text to the image, and the like.

In some embodiments, the webpage can comprise multiple product images. The modifications can be applied to the logo, and the modified logo superimposed on each of the product images on the webpage. The user can select to save the webpage, for example via a URL, that can be re-accessed and/or shared with other users. In some embodiments, the user can request to navigate to a different webpage than the current webpage, and the product images on the different webpage can also have the modified logo superimposed on the product images.

In some embodiments, the product image can comprise video. In other words, the product image can comprise multiple images. In such cases, the logo can be applied to the multiple images such that the logo appears to move with the video. For example, a company logo can be selected to be superimposed on a t-shirt. The video shows a man walking on a windy street wearing the t-shirt. The logo can be superimposed on the t-shirt in such a way that the logo moves with the wind similar to how the t-shirt moves with the wind.

Promotional merchandise can comprise products often branded with a logo or slogan that is used in marketing and communication programs. Promotional merchandise is often given away by a company at shows, conferences, or talks to promote the company brand. Almost anything can be branded with a company name or logo, comprising t-shirts, caps, keychains, posters, pens, mugs, toys, mouse pads, etc. These promotional products often provide a useful function to the consumer such that the consumer can continue using the product and keep the product in their possession for a longer period of time, enabling the promotional me chaise to effectively market their company logo or name.

Customization of products enables corporations to improve marketing by providing promotional products and/or products that are personalized to the consumer. Some embodiments of the present disclosure provide systems and methods for enabling effective customization of a product as well as providing a preview of the image on the product's canvas.

Some embodiments of the present disclosure enable a consumer to be able to place an electronic image (for example, a corporate logo) onto one or more products. A preview of what the electronic image would look like on the product can be created. This preview can be shown to the consumer before the consumer decides to go forward with the electronic image. The consumer can modify and/or customize the preview depending on the consumer's desires and goals. For example, the consumer can change the orientation, the way the electronic image is formed to the shape of the product's canvas, etc.

The consumer and/or the system can take into consideration characteristics of the product to determine how the electronic image can be modified, such as by collecting information on the product itself. Such characteristics can comprise the material of the product, the number, size, location, and curvature of the product canvas, any metadata associated with a product image and/or an electronic image, the curvature of the product in the image, the perspective of the product image, and so forth.

These characteristics can be used to modify the logo image on the virtual canvas to create a preview image for the consumer to preview what the logo image would look like on the product. Some examples comprise rotating the image, making the image transparent, changing or filling a color or color scale, stretching pixels of an image to fit the canvas of the product or the perspective of the picture, combining multiple logo images, changing the size of the image, adding text, changing a background color or an edge of an image by filtering the background color, cropping an image, adding a frame or outline, free drawing on the image, etc.

Some embodiments of the present disclosure identify a logo image to be placed on the product. The consumer can participate in the selection of the logo image. The consumer can request the generation of a logo and a third party logo creation system and/or entity can create such a logo. The consumer can submit keywords and the keywords can be searched in an internal database. The pictures can be taken from a video, an image library, or selected from a licensed image database.

In some embodiments, the system takes action to at least partially automate the selection of the logo image. The system can pull images from an image database server (e.g. via an API) and/or have a collection of uniform resource locators (URLs) directed to images. Keywords submitted by the user can be used to search for images in an internal and/or external database. The system can make purchases or arrange for a license for a licensed image that can be selected by a consumer. The system can also utilize machine learning and/or other automated image selection and/or recommendation approaches to automatically determine the image that fits the particular scenario.

In some embodiments, the system can create a vector image file as a result of an image selection and/or modification of the image to be printed onto a canvas of a product. The vector image file can be used by a printed (for example, a 3D printer) to print the image onto the product. The vector image file can be of various formats, such as a rasterized image file or a vectorized image file. The vector image file can be modified based on user command, characteristics of a product, and/or characteristics of the logo image as will be described in further detail below. The vector image file can also be used to determine print characteristics (for example, the type of ink to be used during printing). The vector image file can also be used to be displayed on a user display device such as an augmented reality display.

Electronic Communications Account or E-mail Generation and Management System

FIG. 1 is an embodiment of a schematic diagram illustrating an embodiment of a product customization and preview account generation and management system. In some embodiments, a main server system 102 can be comprised of a product customization and preview account generation module 104, a billing module 106, an authentication module 108, a web server 110, an image processing module 111, an image vectorization module 113, a user account database 112, a preview image database 114, a user profile database 116, a product image/characteristic database 117, an logo image database 118, and/or an image file generator. The main server system can be connected to a network 120. The network can be configured to connect the main server to an external logo image database 122, a product manufacturing system, and/or one or more user access point systems 124.

The product customization and preview account generation module 104 can function by generating a product customization and preview account a user inputting information on a sign-in and/or a profile page. In some embodiments, the product customization and preview account can have a standard form, which can comprise the user's name, address, preferences, previous history information, information retrieved from a user's behavior on another website and/or other internet activity, and the like. The billing module 106 can function by charging users for various provided services using any available payment methods. The authentication module 108 can function by verifying the information associated with the user (for example, information inputted by the user; retrieved information based on a user's IP address). The web server 110 can function to serve files that from web pages at the request of users. These web pages can provide an interface for users to interact with the system, these interactions comprising the generation, management, usage, deactivation, and troubleshooting of the user's account and/or selections (for example, selections of a product, an image, a request for a preview, a customization of an image).

The results of the verification process can be used to verify the user. Using the product customization and preview account, a user's previous configurations or customizations can be retrieved. This improves the process of integrating product and logo image by allowing a user to cease work and pick up the work at a later time. Once a user is verified, a user profile can be used to retrieve other customizations that can automatically be applied to a user's future requests.

The verification process can be based on user input. For example, verification can be based on a code sent to a mobile device and/or a browser. In some embodiments, the user can be required to respond to the code (for example enter it into a system to activate an product customization and preview account).

In some embodiments, the individual can access a user interface and review the verification process. The individual can identify portions of the verification process and assess the results. In some embodiments, the system can request further identification verification information (for example identification documents) to verify a user. In some embodiments, the individual can challenge a result in the verification process (for example by submitting a request for the system to reassess an identification document that was interpreted incorrectly).

Processing of the product customization (for example, the customization of an logo image onto an image of a product) can be performed by the product customization and preview account generation and management system. Accordingly, the product customization and preview account system can perform the steps of processing, storing, generating, transmitting, and receiving on a remote server instead of performing such processing on the client device. As such, processing can be offloaded to a remote server, storage of the computations, results, and input needed for the results can be stored on the server rather than on the client device, and the required throughput can be reduced based (for example, the results can be sent instead of all inputs needed to determine the result to the client device).

The product customization and preview account database 112 can provide a collection of all product customization and preview accounts generated or identified by the system or a subset that collection. The preview image database 114 can provide a collection of preview images where one or more logo images are superimposed onto one or more product images. The user profile database 116 can provide a collection of all the user profiles associated with product customization and preview accounts generated by the system, all the characteristics associated with each user profile such as a user's customization preference, and/or a subset of either of these collections.

In some embodiments, the product customization and preview account can comprise an indication of the user's user access point 124 an IP address or browser cookie information.

The product image/characteristic database 117 can provide a collection of images of products that are available on the main server system. The product image/characteristic database 117 can comprise images of products being marketed and/or sold on the website.

The logo image database 118 can provide a collection of images that can be superimposed onto an image of a product. The main server system 104 can comprise an internal logo image database 118. The network 120 can allow the main server system to exchange data with one or more external databases and one or more user access points. The external logo image database 122 can provide a collection of logo images that can be stored within the main server system, that the system can retrieve, reference, and/or display on a user's screen for use in the various embodiments. The user access points 124 can provide users with an interface to access and communicate with the main server system, and to utilize the functional aspects of the system. The user access points 124 can comprise a user interface 125 to display images to the user and to allow users to enter commands. The user access points 124 can comprise user data 126 that can be stored with the user profile.

The main server system 102 can communicate with a product manufacturing system 130. The main server system 104 can finalize the superposition of a logo image from the logo image database 118 onto a product image from the product image/characteristic database 117. The main server system 104 can create a package for the product manufacturing system 130 to manufacture the product and/or to label the product with the logo according to the customizations performed on the logo image.

The supplier access point 140 can comprise a user interface 142 for selecting the product of interest and/or selecting characteristics of the product or the product image. The supplier access point 140 can comprise a product database 144 that comprises information about each product provided by the supplier and/or other third parties. The supplier access point 140 can comprise a canvas sizing database 146 that can provide information on the canvas portion of the product where the logo image can be superimposed.

Figure 2:
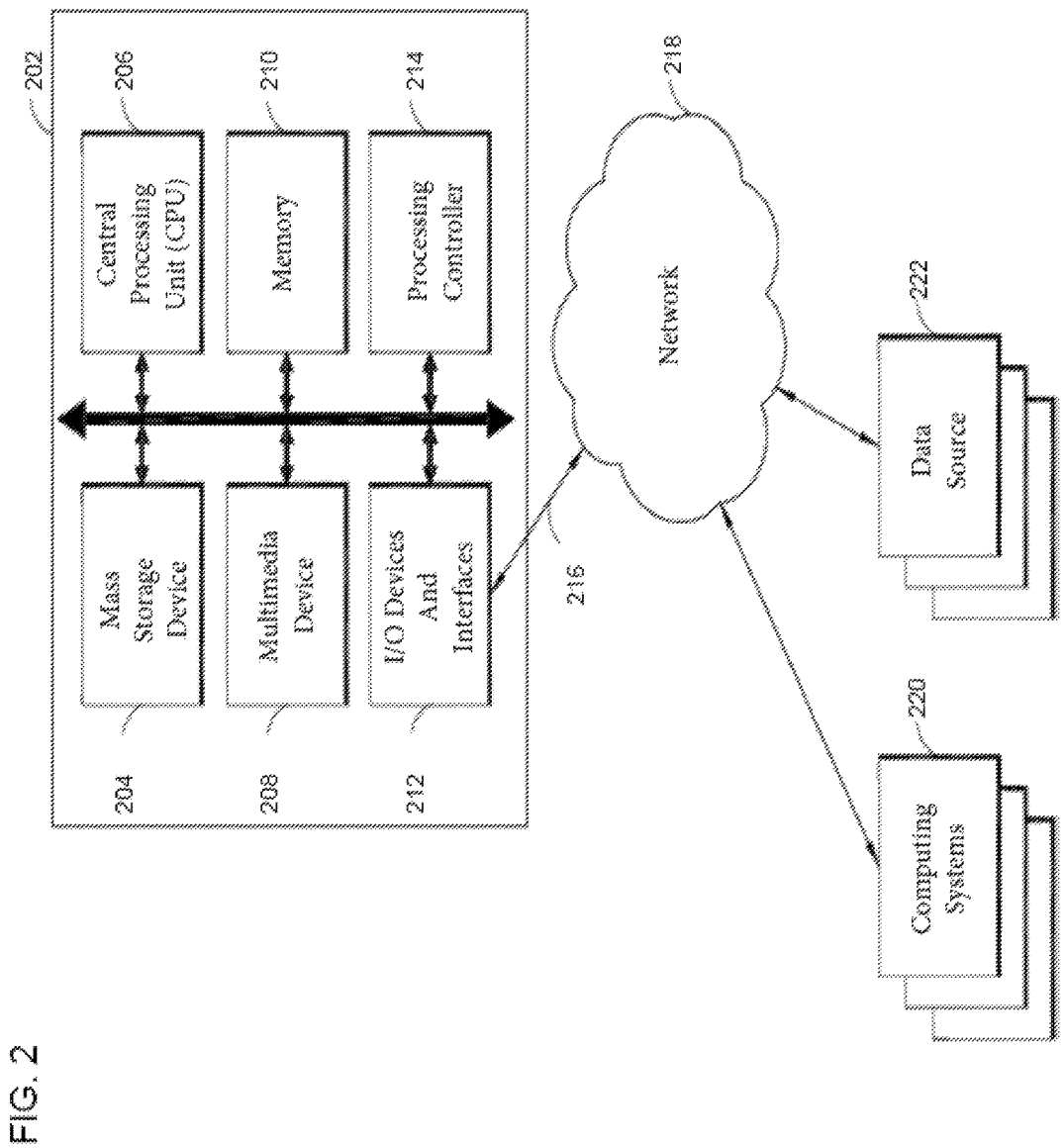
FIG. 2 is a block diagram depicting an embodiment of a computer hardware system configured to run software for implementing one or more embodiments of an product customization and preview account generation and management system.

Computer System in some embodiments, the systems, processes, and methods described herein are implemented using a computing system, such as the one illustrated in FIG. 2. The example computer system 202 is in communication with one or more computing systems 220 and/or one or more data sources 222 via one or more networks 218. While FIG. 2 illustrates an embodiment of a computing system 202, it is recognized that the functionality provided for in the components and modules of computer system 202 can be combined into fewer components and modules, or further separated into additional components and modules.

Computing System Components

The computer system 202 can comprise processing controller 214 that carries out the functions, methods, acts, and/or processes described herein. The computer system 202 can comprise processing controller 214 is executed on the computer system 202 by a central processing unit 206 discussed further below.

In general the word "module," as used herein, refers to logic embodied in hardware or firmware or to a collection of software instructions, having entry and exit points. Modules are written in a program language, such as JAVA, C, or C++, or the like. Software modules can be compiled or linked into an executable program, installed in a dynamic link library, or can be written in an interpreted language such as BASIC, PERL, LAU, PHP or Python and any such languages. Software modules can be called from other modules or from themselves, and/or can be invoked in response to detected events or interruptions. Modules implemented in hardware include connected logic units such as gates and flip-flops, and/or can comprise programmable units, such as programmable gate arrays or processors.

Generally, the modules described herein refer to logical modules that can be combined with other modules or divided into sub-modules despite their physical organization or storage. The modules are executed by one or more computing systems, and can be stored on or within any suitable computer readable medium, or implemented in-whole or in-part within special designed hardware or firmware. Not all calculations, analysis, and/or optimization require the use of computer systems, though any of the above-described methods, calculations, processes, or analyses can be facilitated through the use of computers. Further, in some embodiments, process blocks described herein can be altered, rearranged, combined, and/or omitted.

The computer system 202 includes one or more processing units (CPU) 206, which can comprise a microprocessor. The computer system 202 further includes a physical memory 210, such as random access memory (RAM) for temporary storage of information, a read only memory (ROM) for permanent storage of information, and a mass storage device 204, such as a backing store, hard drive, rotating magnetic disks, solid state disks (SSD), flash memory, phase-change memory (PCM), 3D XPoint memory, diskette, or optical media storage device. Alternatively, the mass storage device can be implemented in an array of servers. Typically, the components of the computer system 202 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 202 includes one or more input/output (I/O) devices and interfaces 212, such as a keyboard, mouse, touch pad, and printer. The I/O devices and interfaces 212 can comprise one or more display devices, such as a monitor, that allows the visual presentation of data to a user. More particularly, a display device provides for the presentation of GUIs as application software data, and multi-media presentations, for example. The I/O devices and interfaces 212 can also provide a communications interface to various external devices. The computer system 202 can comprise one or more multi-media devices 208, such as speakers, video cards, graphics accelerators, and microphones, for example.

Computing System Device/Operating System

The computer system 202 can run on a variety of computing devices, such as a server, a Windows server, a Structure Query Language server, a Unix Server, a personal computer, a laptop computer, and so forth. In other embodiments, the computer system 202 can run on a cluster computer system, a mainframe computer system and/or other computing system suitable for controlling and/or communicating with large databases, performing high volume transaction processing, and generating reports from large databases. The computing system 202 is generally controlled and coordinated by an operating system software, such as z/OS, Windows, Linux, UNIX, BSD, PHP, SunOS, Solaris, MacOS, ICloud services or other compatible operating systems, including proprietary operating systems. Operating systems control and schedule computer processes for execution, perform memory management, provide file system, networking, and I/O services, and provide a user interface, such as a graphical user interface (GUI), among other things.

Network

The computer system 202 illustrated in FIG. 2 is coupled to a network 218, such as a LAN, WAN, or the Internet via a communication link 216 (wired, wireless, or a combination thereof). Network 218 communicates with various computing devices and/or other electronic devices. Network 218 is communicating with one or more computing systems 220 and one or more data sources 222. The computer system 202 can comprise a processing controller 214 can access or can be accessed by computing systems 220 and/or data sources 222 through a web-enabled user access point. Connections can be a direct physical connection, a virtual connection, and other connection type. The web-enabled user access point can comprise a browser module that uses text, graphics, audio, video, and other media to present data and to allow interaction with data via the network 218.

The output module can be implemented as a combination of an all-points addressable display such as a cathode ray tube (CRT), a liquid crystal display (LCD), a plasma display, or other types and/or combinations of displays. The output module can be implemented to communicate with input devices and/or interfaces 212 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module can communicate with a set of input and output devices to receive signals from the user.

Other Systems

The computing system 202 can comprise one or more internal and/or external data sources (for example, data sources 222). In some embodiments, one or more of the data repositories and the data sources described above can be implemented using a relational database, such as a DB2 database, Sybase database, Oracle database, CodeBase database, and Microsoft® SQL Server database as well as other types of databases such as a flat-file database, an entity relationship database, and object-oriented database, and/or a record-based database.

The computer system 202 can also access one or more data sources 222. The data sources 222 can be stored in a database or data repository. The computer system 202 can access the one or more data sources 222 through a network 218 or can directly access the database or data repository through I/O devices and interfaces 212. The data repository storing the one or more data sources 222 can reside within the computer system 202.

Image Preview

In some embodiments, a product customization and preview system can identify a logo image to be displayed on a user access point system, such as the example shown in FIG. 3A. FIG. 3A is a flowchart depicting an embodiment of a method for creating a preview image and a vector print ready file. At block 302, the product customization and preview system can request information on one or more products. In some embodiments, the product customization and preview system already has the information on products in its own internal database and can access this information internally. The information on the product can be a name, a code, and/or other identifier for the product. The information can also comprise particular information on the product itself, such as the dimensions, the number of canvases that a logo can be printed on, etc.

At block 304, the product server system can retrieve information on the one or more products from a product image/characteristic database 306 and can transmit the product image and characteristics back to the product customization and preview system at block 308. The product server system can retrieve the product information based on a request for information directly from a user access point system, the image server system, another third party entity, and/or can make the determination to retrieve and transmit the product information on its own. The product server system can also send a product image. The product customization and preview system can also have the product image already stored internally in its own internal database.

At block 310, the product customization and preview system can transmit network resources to the user access point system. The network resources can comprise at least a portion of a website to be displayed at the user access point system. The transmitted information can comprise one or more images of a product. The product customization and preview system can transmit information on the product and/or product image. The product customization and preview system can store information on the product and/or product image internally to perform its own internal processing on this information, as will be described in more detail below.

At block 312, the user access point system can display a product image. The user access point system can display such information on a website, a mobile application, a browser, and/or store the received information on an internal database.

At block 314, the user access point system can receive from the user a selection of an option to select an electronic image (for example, a logo image) to be superimposed onto the picture of a product. In some embodiments, the user access point system can automatically determine when a logo image is selected or when the user is requested to upload an image from the computer or when the user is requested to enter in other form of input in the image selection process.

At block 316, the user access point system can determine whether the user selects to upload a file from the user access point system and/or other storage of the user (for example, a user home computer, a user cloud account, a user mobile phone). If the user access point system receives instruction to upload the image from the computer, the user access point system displays an option to select a local image file at block 318.

At block 322, the product customization and preview system can identify modifications to the logo image. The user access point system can also fully or partially identify modifications to be done on the logo image. Modifications can also be made to the product image. The modifications can be made via user input. For example, the user can decide to stretch or crop an image before the image is sent to the product customization and preview system. The modifications can happen automatically via the product customization and preview system. The modifications can be made based on one or more factors, comprising the characteristics of the product, characteristics of the canvas, characteristics of the product image, and/or characteristics of the logo image. Because the modifications can occur on the product customization and preview system, the user access point system has more resources to perform other tasks. The product customization and preview system can be a server with more computational resources that the user access point system. Accordingly, performing the modification, as well as other steps in this application, on the product customization and preview system frees the user access point system that is likely to not have as much processing computational resources as well as storage space as the product customization and preview system.

At block 324, the product customization and preview system can identify the location of the canvas for the product image and at block 326, the product customization and preview system can superimpose the logo image onto the product image to create a preview image for the consumer. Although FIG. 3A illustrates superimposing the logo image onto a single product image, the logo can be superimposed on a plurality of canvases of the product image and/or on multiple images.

At block 328, the product customization and preview system can save the preview image to an internal database 330. The image can be sent to a third party entity, such as an image server system and/or a product server system.

At block 331, the product customization and preview system can create a vector print ready file and transmits the vector print ready file to the user access point system. In some embodiments, the preview image is sent to the user access point system and/or the vector print ready file is sent to the product server system. Because the logo image can be automatically modified in a variety of different ways based on a variety of different characteristics as disclosed throughout this disclosure, some embodiments of the present disclosure provide a technical solution to the problem of vector print ready files. For example, the vector print ready files did not take into account the various changes in file types, modifying the file for 3D printing, augmented reality, sharing electronically with others, etc. At block 332, the user access point system displays the preview image to the user.

At block 316, the user can have other ways of selecting a logo image for the preview and/or product customization. One alternative example is that the user can input keywords at block 320. Then the image server system can parse the keywords as search terms at block 334 and search the logo image database for these search terms at block 336 in the logo image database 338. The product customization and preview system can also perform this image search. The product customization and preview system can utilize a third party search engine (for example the image server system) to identify search hits based on the keywords entered. At block 340, the image server system transmits the URLs (and/or the images themselves) of the matched logo images to the user access point system.

At block 342, the user access point system can display the matched logo images to the user. The user access point system can load the images based on the received URLs. The product customization and preview system can alternatively load the images based on the received URLs and send the images to the user access point system. The image server database can comprise the images themselves and/or the URLs that point to the images. The image server database can comprise a low resolution image file with a URL that is addressed to the full size image file.

At block 343, the user can select an image from the logo images that were a search hit based on the keywords. Then, the image can be modified by the product customization and preview system at block 332.

Third Party Vendor Product Images

In some embodiments, the product customization and preview system can provide an e-commerce website for third party vendors to sell and/or provide their products and services. FIG. 3B is a flowchart depicting an embodiment of a method for creating preview images of third party vendor product images.

At block 352, a third party vendor system can request to provide a product for sale on an e-commerce website. The third party vendor system can request to provide a product and/or a service. The product and/or service can be placed on the website for sale, for promotion, for lease, and/or other purpose.

At block 354, the product customization and preview system can authenticate the third party vendor. The product customization and preview system can authenticate the third party vendor via log-in credentials. The product customization and preview system can authenticate the third party vendor based on an identifier for the third party vendor and/or an identifier for the product or service. The product customization and preview system can identify whether the product, the service, and/or the third party vendor represents a potential fraudulent request. For example, the product customization and preview system can identify whether the product or service is a counterfeit product.

At block 356, the product customization and preview system can request product information from the third party vendor system, and at block 358, the third party vendor system can retrieve product information from the product image/characteristic data base 360. The product information can comprise a product identifier that identifies a particular product and/or a product image. The product information can comprise characteristics of the product and/or the product image, such as the number of canvases on the product for which a logo image can be superimposed, or dimensions of a product.

At block 362, the third party vendor system can transmit the product image and product characteristics to the product customization and preview system. In some embodiments, the product image and/or product characteristics can be transmitted to the user access point system, and functionality can be performed at the user access point system.

At block 364, the product customization and preview system can determine whether product image canvas information is available from the received product image and characteristics. For example, the product image canvas information can comprise the location of a canvas on the product, the location of the canvas on the product image, the dimensions of a canvas, the number of canvases, the similarities between the canvases, the material of the canvas, restrictions or limitations on the canvas and/or the virtual canvas, dimensions for the virtual canvas, and the like.

At block 366, product image canvas information is available, and the virtual canvas can be initiated using the product canvas information. For example, the virtual canvas can be created using the dimensions of the virtual canvas. In another example, a virtual canvas can be created for the front of a bag and an option to flip to a second virtual canvas for the back of the bag. Then, the user can view and edit the virtual canvas separately for the front and back of the bag.

At block 388, the product image canvas information may not available, and the product customization and preview system can generate user interface data for product image canvas determination. In some embodiments, the product customization and preview system automatically determines the product image canvas information instead of requesting the third party vendor system for that information.

At block 390, the third party vendor system can receive the user interface information and displays the user interface data to the third party vendor system. The third party vendor system receives a selection of canvas parameters. For example, the third party vendor system can receive a selection of a portion of the product (for example, the front of the bag) and dimensions for the virtual canvas (for example, a 3×4 inch area of the front of the bag) for the first virtual canvas. The selection can be made via input of parameters, such as at a height and width, and/or can be made via a selection (for example, a click and drag of a mouse over an area).

At block 392, the system can determine whether all available canvases are determined. If not, then the process returns to block 390. The third party vendor system can then receive another selection of canvas parameters (for example, for the back of the bag).

At block 394, the third party vendor can receive a selection of a default canvas. The default canvas can be automatically determined. The default canvas can indicate the first canvas to be displayed to the user and/or available for editing by the user access point system. Then, the virtual canvas is initiated at block 366 with product canvas information.

At block 368, the user access point system can receive a selection of a logo image. The logo image can be an image of a company name or logo, alphanumeric title, a background color or pattern, a photograph, a video, other form of visual representation on a product, and the like.

At block 370, the user access point system can receive a selection of a virtual canvas if multiple available canvases are available on the product. A default canvas can be initially displayed to the user access point system. The default canvas can also be automatically chosen.

At block 372, a preview image of the logo image superimposed onto the virtual canvas can be displayed on the user access point system. The preview image can be automatically generated and/or manually created via input received at the user access point system.

At block 374, the user access point system can receive an image modification command. The image modification command can comprise commands such as stretching the image, changing the color, adding text, rotating the image, cropping the image, resizing the image, adding a logo to the image, combining multiple images, changing a background color, removing a frame of the image, free drawing on the image, blending border lines within an image, changing a color scale of an image, and the like.

At block 376, the user access point system can modify the preview image according to the modification command received at block 374. The user access point system can also automatically determine a modification or recommendations for modifications to display to the user access point system as recommendations. The modification recommendations can be based on previous user input, a user profile, or other user behavior. The preview image can be updated and displayed at block 372.

At block 374, if an image modification command is not received, the user access point system can determine whether another virtual canvas is available at block 378. For example, if there is another virtual canvas, then a preview image of the another virtual canvas can be displayed.

At block 380, the next virtual canvas can be selected, and at block 372, the preview image for the next virtual canvas can be displayed.

At block 382, the product customization and preview system can generate a vector print file. The vector print file can be used by the third party vendor system to print a logo image onto a physical product at block 384, and ship the product to the user if the user were to make a purchase on the e-commerce website of the product customization and preview system at block 386.

Modification Based on User Profile

Figure 4A:
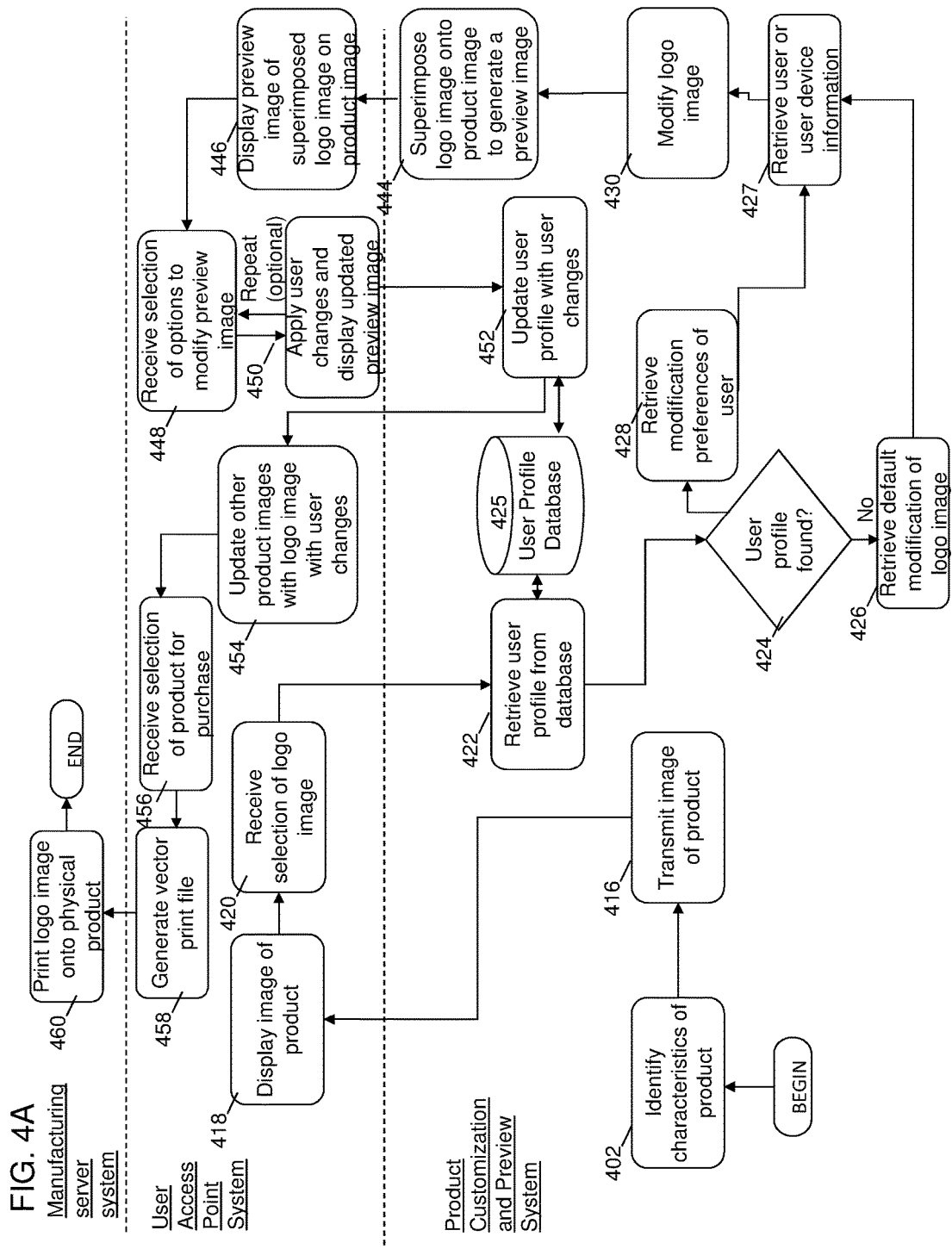
FIG. 4A is a flowchart depicting an embodiment of a method for modifying a logo image based on a user profile.

In some embodiments, the product customization and preview system can make modifications to a logo image (and/or a product image), such as the example shown in FIG. 4A. FIG. 4A is a flowchart depicting an embodiment of a method for modifying a logo image based on a user profile. At block 402, the product customization and preview system can identify characteristics of the product, such as dimensions, material, canvas location and number, etc. These characteristics can be used to determine what types of modifications need to be made on the logo image for superimposing onto the product canvas. At block 416, the product customization and preview system can transmit the image of the product to the user access point system, and at block 418, the user access point system can display the image of the product. The image can be displayed on a browser, a mobile application, or other graphical user interface. The image can be displayed on a website along with other product images.

At block 420, the user access point system can receive a selection of a logo image from the user access point system. The user can select a logo image by uploading an image, by performing keyword searching on a search engine, and other ways as described throughout this disclosure.

At block 422, the product customization and preview system can retrieve a user profile from a user profile database 425. The product customization and preview system can determine whether a user profile is available for the user at block 424. If a user profile is found, the product customization and preview system can retrieve modification preferences of the user at block 428. The preferences can be previous modifications made by the user, patterns of behavior that can be used to determine or suggest modifications for the user, and/or using other characteristics of the user to determine modifications.

The user profile can be used for image selection. For example, the user profile can identify a characteristic of a user to determine the type of logo image, product, and/or modifications to the images. The user characteristics can comprise demographic data, sex, race, economic status, age, level of education, income level and employment, psychiatric data, medical data, a personality trait, an interest, values, attitudes, lifestyles, opinions, preferences, likes or dislikes, predilections, purchase history, browser history, financial history and data, credit history and data, personal history and data, other activity data, and the like.

If a user profile is not found, the product customization and preview system can generate a user profile and/or retrieve default modifications at block 426. The default modifications can be determined based on the product information, on any information on the user and/or the user device, the logo information, etc. At block 427, information on the user and/or the user device is retrieved, and the logo modified at block 430. For example, the modification can be based on the type of user device. If the user is on a mobile device, then the modification can be made to fit the screen or the type of screen of the user device. The modification can also be based on an IP address of the device. For example, if the IP address of the device indicates that the screen is in China, then the modification can be made to comprise or translate Chinese characters. The use of such user device information was not available before the creation of a virtual canvas on a user device.

At block 444, the product customization and preview system can superimpose the modified logo image onto the product image to generate a preview image. At block 446, the user access point system can display the preview image of the superimposed logo image on the product image.

Once the preview image is displayed, the user can have the option to input commands to the user access point system to modify the preview image at block 448. For example, the user can choose to crop, rotate, and enlarge the logo image and view the changes in the preview image. At block 450, the changes are applied to the logo image and the preview image is updated. After the changes are displayed to the user, blocks 448 and 450 can be optionally repeated, where the user can apply further changes to the logo image.

At block 452, the product customization and preview system can receive the changes made by the user and update the user profile with the user changes in the user profile database 425.

At block 454, the other product images can be modified based on the changes made by the user. For example, the website can comprise a number of different product images, a t-shirt, a mug, a pen. The changes made to the pen can be applied to the logos on the t-shirt and the mug. In some embodiments, the user can select which products the changes should be applied to and/or the changes can only be applied to the selected product and not the other products.

At block 456, the user access point system can receive a selection of a product for purchase. For example, the user can select on the user access point system to purchase ten mugs with the logo after viewing the preview image. At block 458, the user access point system can create a vector print file, which can be sent to a manufacturing server system at block 460, where the logo is printed onto a physical product.

Product, Product Image, and other Characteristics for Making Modifications

Figure 4B:
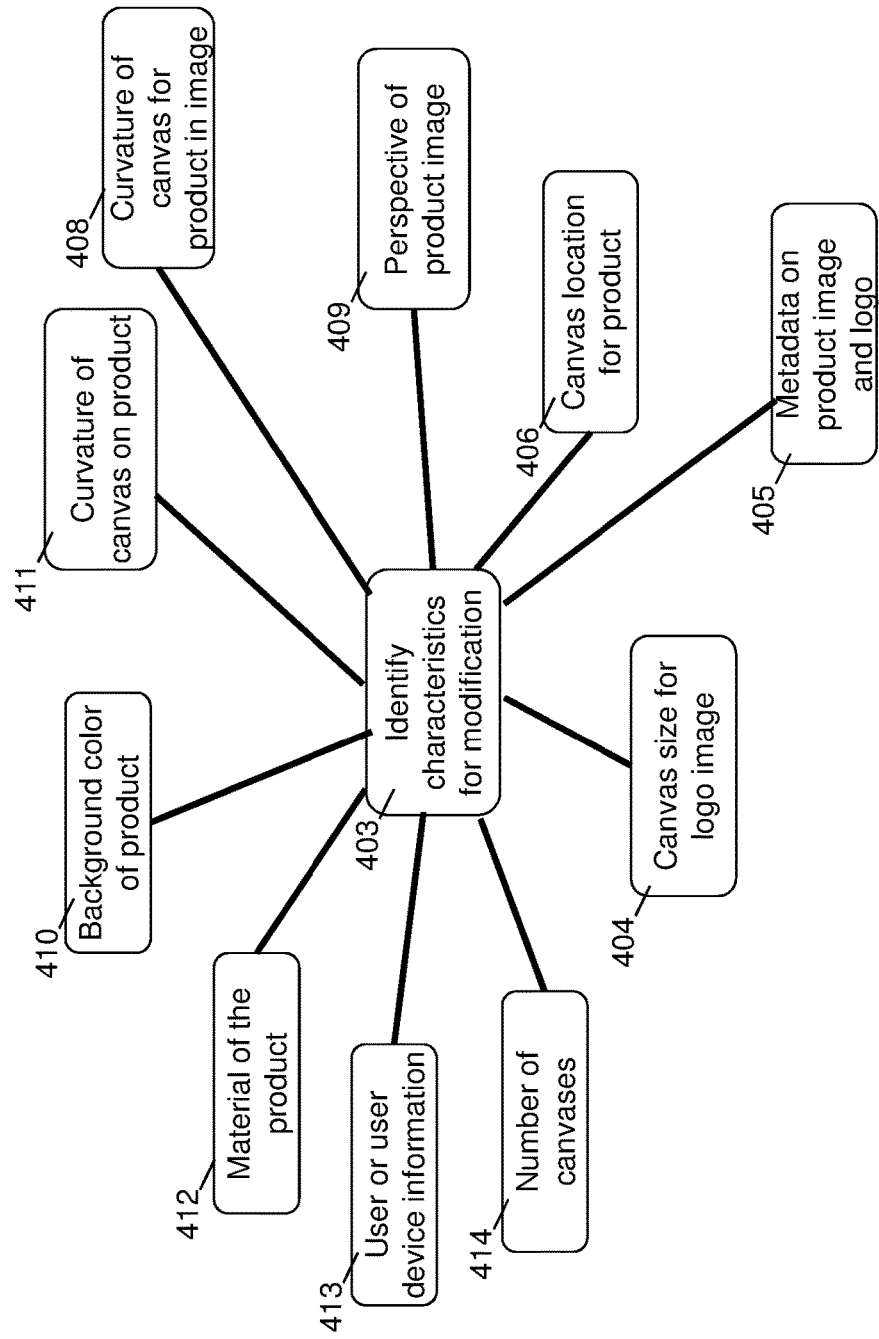
FIG. 4B depicts an embodiment of characteristics of a product that can be used to determine what modifications are to be performed on the logo image and/or the product image.

In some embodiments, the product customization and preview system can make modifications to a logo image (and/or a product image) based on characteristics of a product as shown in the example of FIG. 4B. FIG. 4B depicts an embodiment of characteristics of a product that can be used to determine what modifications are to be performed on the logo image and/or the product image.

At block 403, the product customization and preview system can identify characteristics of the product. These characteristics can be used to determine what types of modifications need to be made on the logo image for superimposing onto the product canvas.

As shown in block 404, the canvas size can be used for modifying the logo image. For example, if the canvas size is small for the product or wider than the image file, the logo image can be reduced, fitted, or cropped to fit the canvas of the product.

In block 405, metadata of a product image and logo can be used. Metadata can comprise data that cannot be determined by viewing the product. For example, the metadata can comprise canvas size information, or that certain portions of the product should only be printed with black and white rather than in color because of the product's composition.

In block 406, the canvas location for the product can be used to determine modification for the logo image. The canvas location on the front of the product can be modified differently than a canvas location on the top of the product. For example, a canvas location on the front body of a bag can be modified differently with larger font and colors that blend with the body of the bag, whereas a canvas location on the strap of the bag which can be modified with a single bright color.

In block 409, the perspective of the product image can be used to determine how the logo image will be modified. For example, for a front perspective of a bag, the logo image may not need to be modified to appear aligned with the front perspective. However, if the picture was taken at an angle, then the logo can be stretched to look aligned with the perspective of the picture.

In block 408, the curvature of the canvas for the product image can be considered when modifying the logo image. For example, for a t-shirt, the canvas of the product image can be wrinkled. Then, the logo image is modified to fit the wrinkles as to look naturally printed onto the t-shirt.

In block 411, the curvature of the canvas on the actual product can be considered when modifying the logo image. For example, for a mug, the canvas of the product image is curved. Then, the logo can be stretched to look curved along with the curvature of the mug.

In block 410, the background color of the product can be considered when modifying the logo image. For example, for a purple handbag, a logo image with a yellow background can be considered fashionably distasteful because of the color between the yellow and the purple. The yellow background in the logo image can be removed. The yellow background can also be replaced by a different color, such as the purple color of the bag or another color that matches with the color of the bag.

In block 412, the material of the product can be considered. For example, there can be certain types of ink that are only available in certain colors that are known to look better with the material of the product or that are more durable on a particular material.

In block 413, user information or user device information can be used to make modifications. For example, if the user device is a mobile phone, then the modifications can be made to clearly show certain text or color matching to the screen of a mobile device, whereas if the user device is a home PC, then the user can view multiple product images at once. Thus, the modifications can be more aligned with showing complementary logos between products. In some embodiments, user cookie data can be used to determine characteristics for modification of the logo image. Cookie data can show prior behavior of the consumer during prior browsing sessions which can provide insight into how the consumer may want to modify the logo image. Cookie data can also provide other information about the user, such as an IP address. The system can use the IP address of a user device and identify its location. Then, the system can determine modifications to make to the logo image based on the location. For example, if the user device is located in China, the system can incorporate Chinese characters into the logo.

In block 414, the number of canvases can also be considered when modifying the logo image. The more the number of canvases, the modifications can be made more uniform or varied. For example, if a product has 2 canvases, the modifications can be such that the logos are quite different, whereas if the product has 10 canvases, the logo image can be more uniform.

Types of Modifications

Figure 4C:
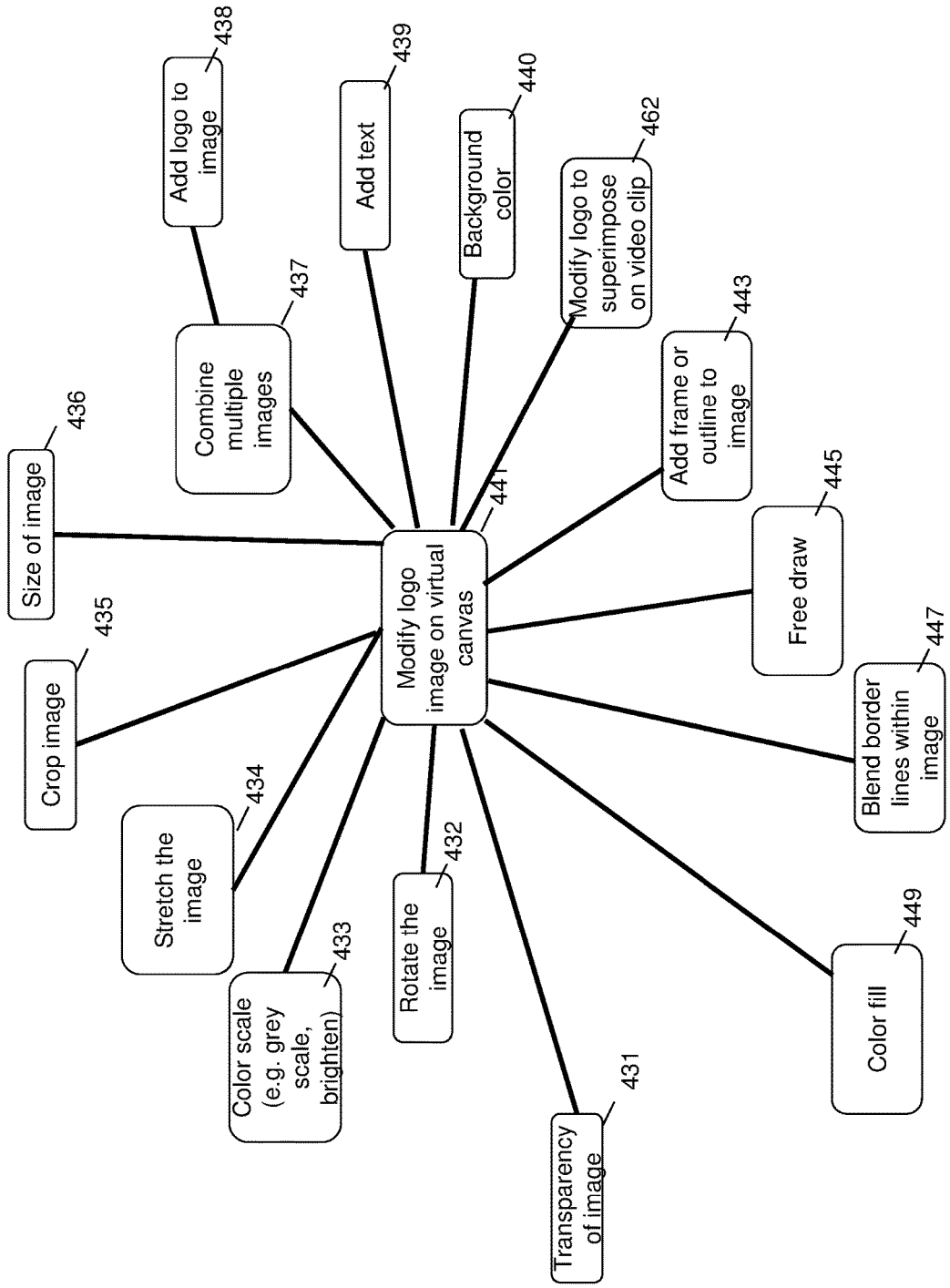
FIG. 4C depicts an embodiment of the types of modifications that can be made to a logo image and/or the product image.

In some embodiments, the product customization and preview system can make a number of different types of modifications as shown in the example of FIG. 4C. FIG. 4C depicts an embodiment of the types of modifications that can be made to a logo image and/or the product image.

At block 441, the product customization and preview system can identify the type of modification to be performed on a logo image to be superimposed on a product image on a virtual canvas to create a preview image. The virtual canvas can display the preview image. The virtual canvas can comprise user interface options for the user to manually select modifications to be made. The virtual canvas can automatically make certain modifications.

At block 431, the transparency of the logo image can be changed. For example, if the background color of the product is white, then a strong logo image color can contrast too strongly with the white color. Thus, the logo image can be transparent such that the color does not contrast as much as it would.

At block 432, the logo image can be rotated. The logo image can be rotated based on the perspective of the picture. If the picture is taken from an angle, the logo image can be rotated to look natural from the angle of the picture. If the canvas of the product is tilted, then the logo image can be rotated with the same tilt.

At block 433, the color scale can be modified. For example, if the bag is of a brighter pastel color, the color scale of the logo image can be brightened, whereas if the bag is of a darker color, the color scale of the logo image can be darkened.

At block 434, the image can be stretched. Such image stretching can be to account for the perspective of the product photograph. For example, if the photograph was taken at an angle, the image can be stretched in line with that perspective. The image can be stretched to fit the contour of the product image and/or the product. For example, for a mug, the image can be stretched to fit the curved contour of the mug. In another example, for a t-shirt, the image can be stretched in certain ways to fit the wrinkles of a t-shirt.

At block 436, the size of the logo image can be modified. At block 435, the image can be cropped. The size of the logo image can be modified or the image can be cropped based on a characteristic of the canvas. For example, if the user device is associated with a mobile device, then the logo can be modified to be smaller and/or the image cropped to fit the size of a phone screen.

At block 437, the virtual canvas can be used to combine multiple images. For example, at block 438, an image of a store can be combined with an image of a logo.

At block 439, text can be added to the logo image. For example, information on the price, the type of product, a company slogan, the purpose of the promotional merchandise, and the like can be used to add additional information to the superimposed logo image.

At block 440, the background color of the logo image can be changed or removed. For example, if the background color of the logo image was a dark brown but the product color was green, then there can be color dismatching. In this scenario, the background color of the logo image can be removed or can be changed to the green color of the product.

At block 443, a frame or outline of the logo image can be removed and/or added. If the logo image had a distasteful brown color, then the brown frame can be removed. If the user wants to add a bright red outline, a bright red line can be added to the outside of the logo image.

At block 445, a free draw tool can be used to draw objects, characters, lines, and the like. At block 447, border lines between colors can be blended to look more natural. The border lines can be the lines between the logo image and the product image. The border lines can be lines within the logo image or the product image. At block 449, a color fill option can be used to fill a portion of the logo image into a single color.

At block 462, the logo can be modified to be superimposed on a video clip. The video clip can be segmented into several product images and the logo can be modified for each product image in the video clip. For example, if the bag moves from one side to the other, the product images in the video clip can show the bag at the far left, left-middle, middle, right-middle, and right positions. The logo can be superimposed onto the bag depending on the location of the bag in the video based on the product images. In some embodiments, a difference in product images can be used to determine how the modifications can be changed from one product image to another. For example, the first product image can show the bag on the left, and the second product image can show the bag on the left-middle position. Then, the logo can determine the delta change in position and make modifications based on that delta difference.

Modification Recommendation and Modification Propagation

In some embodiments, the product customization and preview system can make recommendations of modifications to a user and can propagate the modifications to other websites as shown in the example of FIG. 5A. FIG. 5A depicts an embodiment of making recommendations of modifications to a user and propagating the selected modification to product images on other websites.

At block 502, the product customization and preview system can request information on a product. At block 504, the product server system can retrieve the information on the product from the product image/characteristic database 506. This information can be transmitted at block 508 to the product customization and preview system to be assessed and to automatically extract canvas features at block 510. For example, the product information can comprise dimensions of the product, and the product customization and preview system can determine and/or estimate the canvas information from these dimensions.

The user access point can display logo images, and the user can select a logo image at block 512. The user access point system can transmit this selection to the product customization and preview system, where the product customization and preview system can retrieve custom templates for logo modification at block 514.

At block 515, the product customization and preview system can generate preview images for recommendations based on the customized templates and canvas features. For example, the custom templates can comprise three modification types. The first modification type can comprise superimposing the logo image onto the product canvas. The second modification type can comprise removing the outer edge of the logo image and superimposing the image without the outer edge onto the product canvas. The third modification type can comprise removing the outer edge and the background color of the logo image and superimposing the image without the outer edge or the background onto the product canvas.

At block 516, the user access point system can provide preview images for logo modification as recommendations. The recommendations can be preview images of the three different modification types. At block 518, the user access point system can receive a selection of one or more of the recommendations, and the user access point system can display a preview image while allowing the user to make further modifications beyond the modifications made by the custom template at block 519.

At block 520, the product customization and preview system can store the selected custom templates and modifications at block 520 into a user profile database 521. The user profile database can store the selected recommendation as well as any further modifications made by the user. Then, the next time the user wants to view a preview image of a logo and a product, the product customization and preview system can present a recommendation based on previous behavior.

At block 522, the product customization and preview system can apply the modifications to other product images on the current website that the user is viewing. At block 524, the user access point system can display the full website with the modified logo on each product image. For example, if the user selected a logo on a mug without outer edges and rotates the image 15 degrees, then the logo can be superimposed on other products on the website, such as a t-shirt and a pen, without outer edges and rotated 15 degrees. At block 524, the user access point system can display the other product images with the modified logo.

At block 526, the user can select a URL to a new website. At block 526, the user access point system receives the user selection of a URL. Then, the product customization and preview system identifies the product images on the new website. At block 530, the product customization and preview system retrieves the selected recommendation template and any further modifications made by the user. The product customization and preview system then applies the changes to the new product images on the new webpage. At block 532, the user access point system displays the product images on the new website with the modified logo image superimposed.

At block 534, the user access point system receives a selection to share to another person. The product customization and preview system retrieves the electronic address to send the preview image to and transmits the preview image to the electronic address for sharing.

At block 536, the product customization and preview system can transmit the preview image and/or webpage to the address for sharing. In some embodiments, the user can select to share one or more images and/or an entire webpage with images. The sharing can be provided via a URL that can link a browser to a website that displays the product images with the logo superimposed. The shared image and/or webpage can display modifications of the logo made by the sender and/or preferences of the receiver.

Logo Image Selection

Figure 5B:
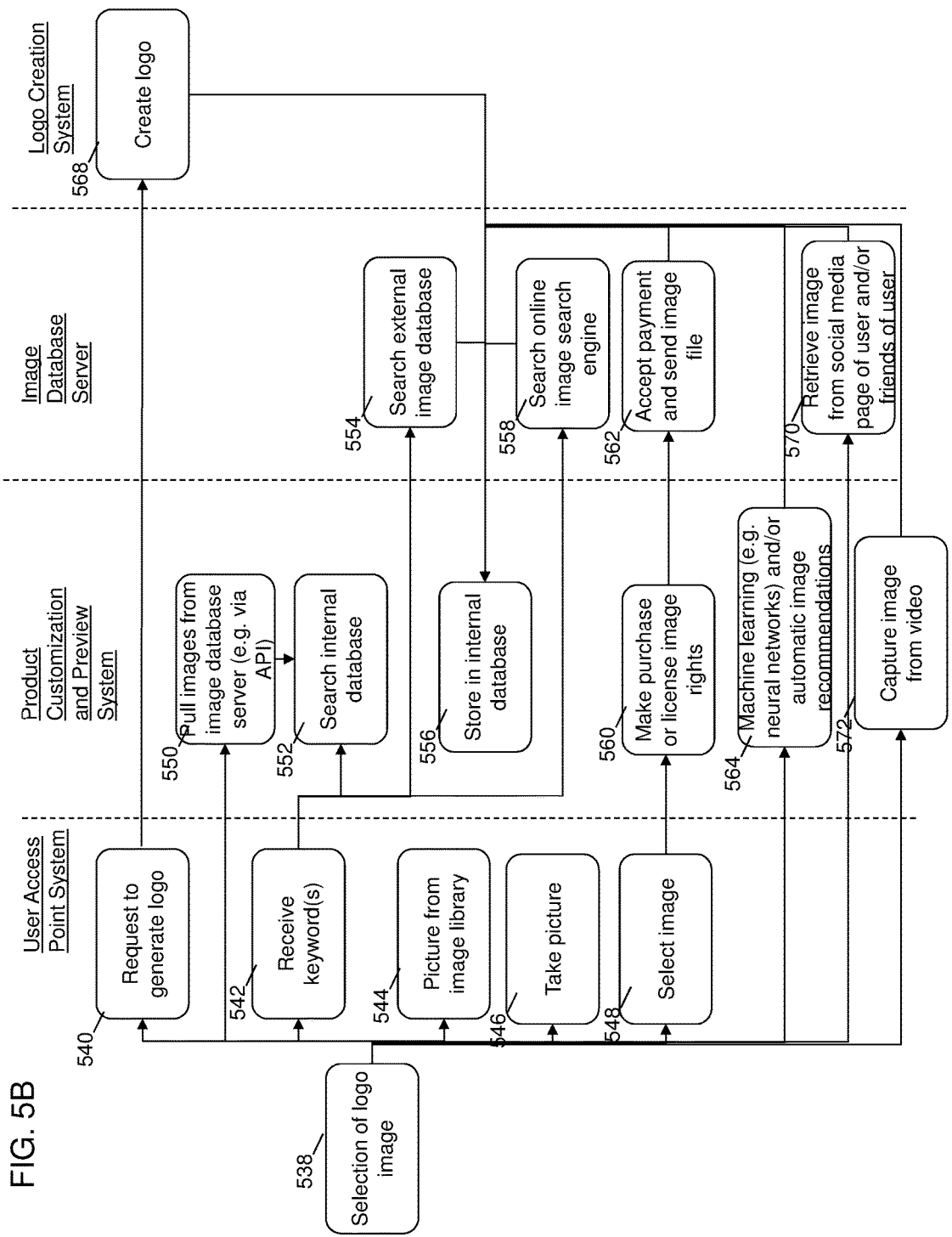
FIG. 5B depicts an embodiment of the different types of logo image selection.

In some embodiments, the product customization and preview system can enable a variety of different types of logo image selection as shown in the example of FIG. 5B. FIG. 5B depicts an embodiment of the different types of logo image selection.

At block 538, the selection of logo image can be initiated. As shown in block 540, the user access point system can request the generation of a logo image, and the request is sent to a logo creation system that creates the logo at block 568. The created logo can be sent to the product customization and preview system to be stored in an internal database at block 556.

The selection of a logo image can also be performed by the product customization and preview system. The product customization and preview system can pull images from an image database (for example via API call) at block 550, and a search for the logo can be performed at block 552 on the product customization and preview system side. As such, the product customization and preview system solves the technical problem of having an updated internal image database by using API calls to pull recent images.

At block 542, the user can provide keywords to the user access point system, and the product customization and preview system can search these keywords in an internal database at block 552 for matching logo images, can search an external image database at block 554 at an image database server, and/or can perform a search on an online image search engine at block 558. The search results and/or the selected logo image from the search results can be stored in the internal database of the product customization and preview system at block 556.

At block 554, a picture can be taken from an image library (for example, an image library of a mobile device). At block 546, the user can take a picture using the user access point system (for example, the camera of a mobile device). At block 548, an image can be selected by the user. The image can be a licensed picture or a picture available for purchase. The product customization and preview system can purchase or license the rights to use the image at block 560. The image database server can be the owner of the image and can accept payment from the product customization and preview system and send the image file to the product customization and preview system at block 562. The image file can be stored in the internal database at block 556.

In some embodiments, the product customization and preview system can automatically determine the logo image file. The product customization and preview system can use machine learning (for example, using neural networks) to make predictions on a user's inclination on a logo image at block 564. The machine learning techniques can be trained to learn the predilections of the user and make recommendations and/or selections of logo images. For example, training data of previous selections by the user with known weightings of the user's preferences of the training data can be used to weight nodes in a neural network. The recommended logo images can be stored in an internal database of the product customization and preview system at block 556.

The selection of the logo image can be via a social media page of the user and/or friends of the user at block 570. The social media page can comprise images that a user wants to add to a product. For example, the user can wish to add a picture with a friend to celebrate their 10 year friendship anniversary.

The selection of a logo image can be a capture of an image from a video at block 572. The logo image can be a one frame capture of the video. The logo image can be a blended combination of several logo images from the video. For instance, if in one frame one man is blinking whereas in the next frame a woman is blinking, the two frames can be combined such that neither the man nor the woman is blinking.

Vector Image File

Figure 5C:
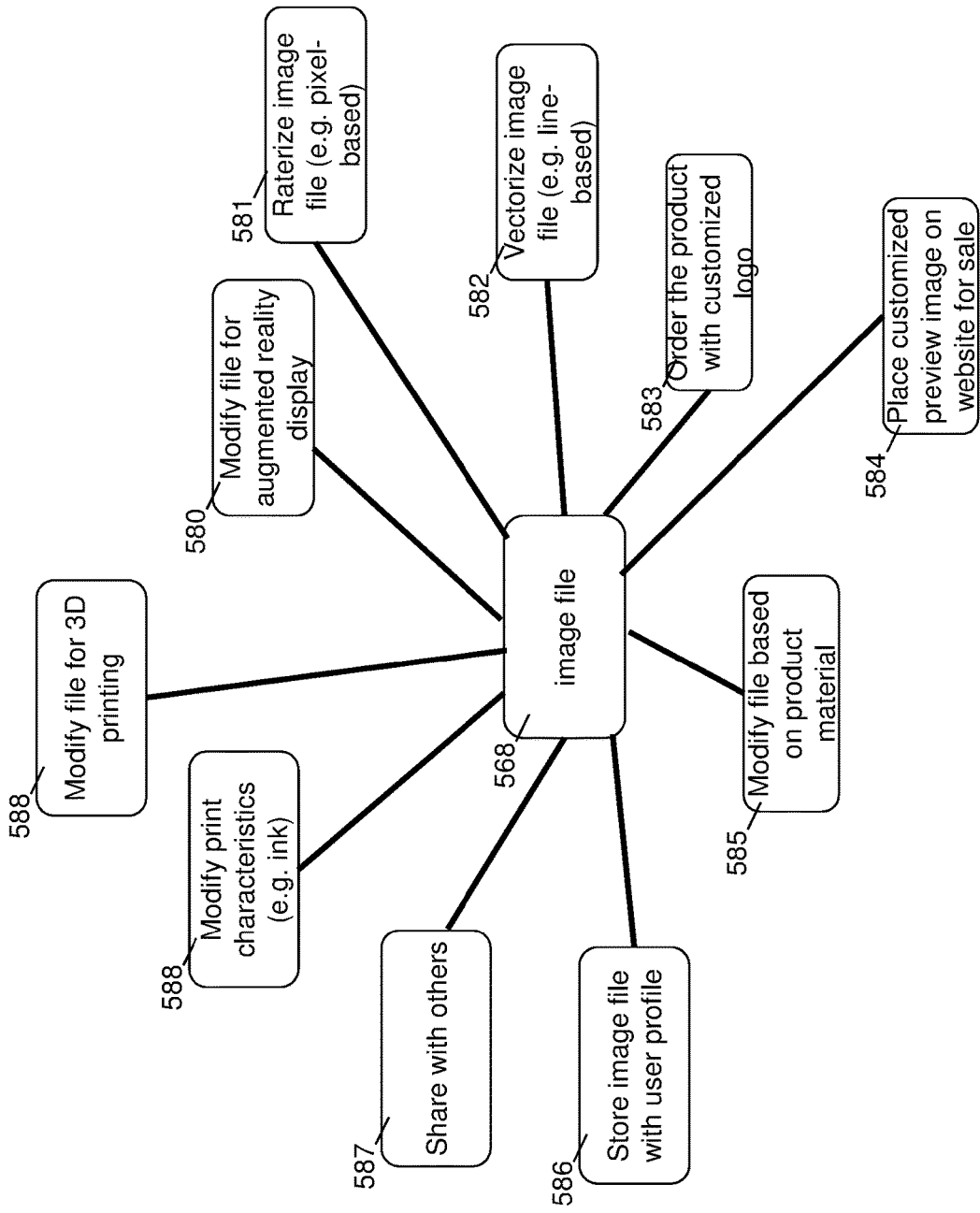
FIG. 5C depicts an embodiment of the different functions from a vector image file.

In some embodiments, the product customization and preview system can enable a variety of different uses from a vector image file as shown in the example of FIG. 5C. FIG. 5C depicts an embodiment of the different functions from a vector image file.

At block 568, an image file can be created. The image file can be a vectorized image file at block 582 (for example line based image file) and/or a rasterized image file (for example, pixel based) at block 581. Rasterized images are generally understood to be created with pixel-based programs or captured with a camera or scanner, a pixel-by-pixel combined to create an image. Vectorized image files are created by drawing outline of shapes, and are generally mathematical calculations from one point to another that form lines an shapes.

At block 583, the user can order the product with the customized logo. At block 584, the product customization and preview system can place the product for sale on their website. The product customization and preview system can accept forms of payment from the consumer, can perform a credit check, can offer financial services (for example loans) to provide funding for the consumer to make such a purchase.

At block 585, the image file can be modified based on the product material. At block 588, the image file can modify the type of ink and/or other print characteristics. For example, if the product is made of plastic, the manufacturer can understand that a certain number of coatings, a certain type of coating, and/or a particular printer ink can be used to print onto plastic, whereas if the product was made of a cloth, a different combination of coating and ink would be used. In some embodiments, the image file can comprise how certain portions should be printed in the print characteristics, such as using a certain type of method of print (for example, laser jet or inkjet)

At block 586, the image file can be stored with the user profile. The image file can be stored to be directly retrieved (for example, the preview image). The image file can contain a history of changes and/or can comprise the changes in chronological order.

In block 587, the image file can be shared with others. For example, the consumer can wish to share it with a forum or community to get other opinion. The consumer can wish to promote their company digitally by posting the customized product on a social media website.

At block 588, the image file can be modified to be a CAD file, or other file, that can be used by a 3D printer. The 3D printer can create the entire, or a portion of, the product with the logo, instead of just superimposing the logo onto the product. The image file can comprise specific information on the type of 3D printer that is capable of printing the product and logo.

At block 580, the image file can be modified to display on an augmented reality and/or virtual reality device. For example, the augmented reality display can display various objects in a person's line of sight and add the logo to these various objects.

User Interface

Figure 6:
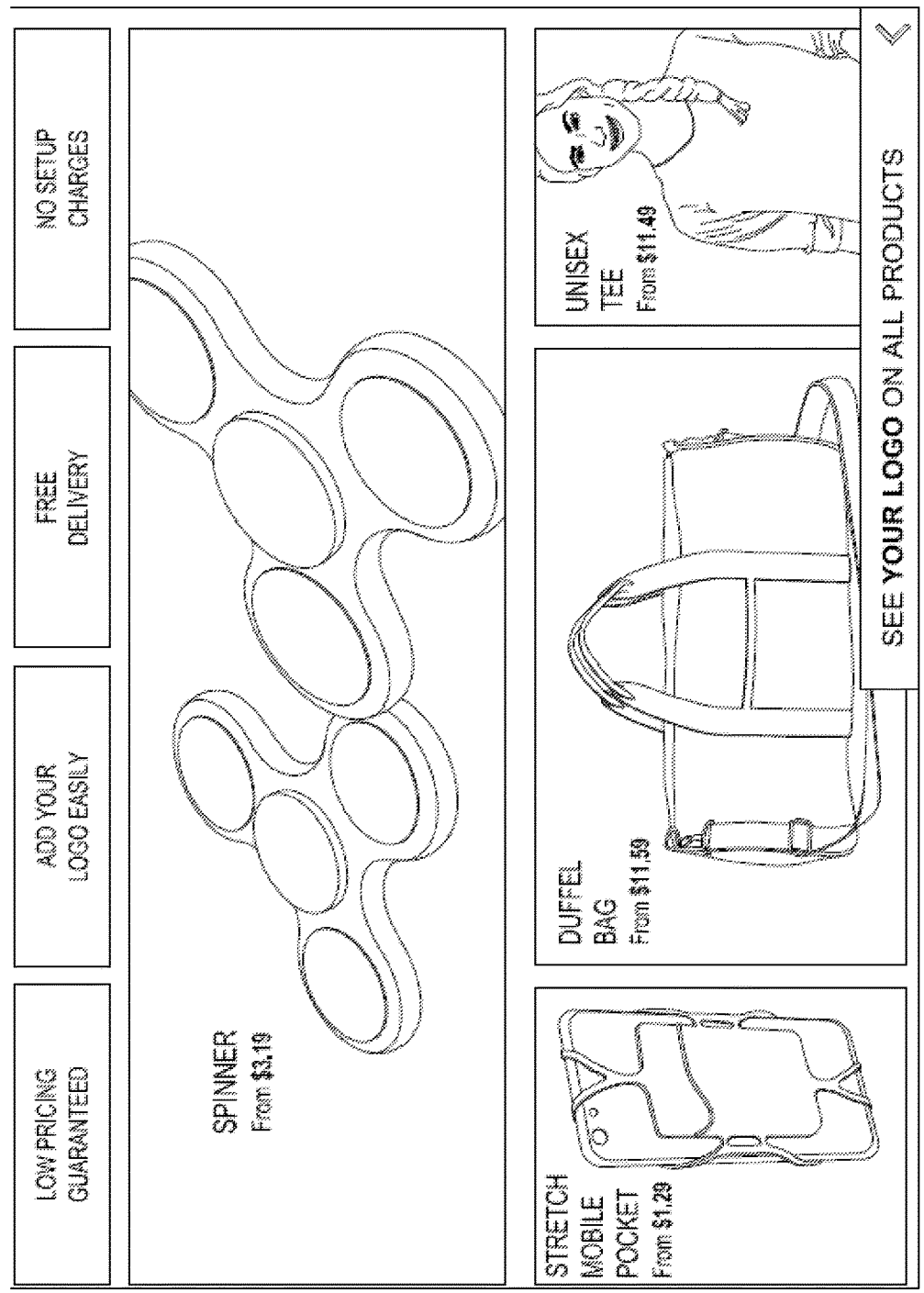
FIG. 6 depicts an embodiment of a website displaying multiple product images.

In some embodiments, the product customization and preview system can display product images as shown in the example of FIG. 6. FIG. 6 depicts an embodiment of a website displaying multiple product images.

The top three product images show three spinner devices. The bottom left product image illustrates a mobile device cover. The bottom middle product image displays a duffel bag. The bottom right product image shows a t-short. At the bottom right, a user has the option of selecting a logo to be applied to all of the products on sale.

Figure 7:
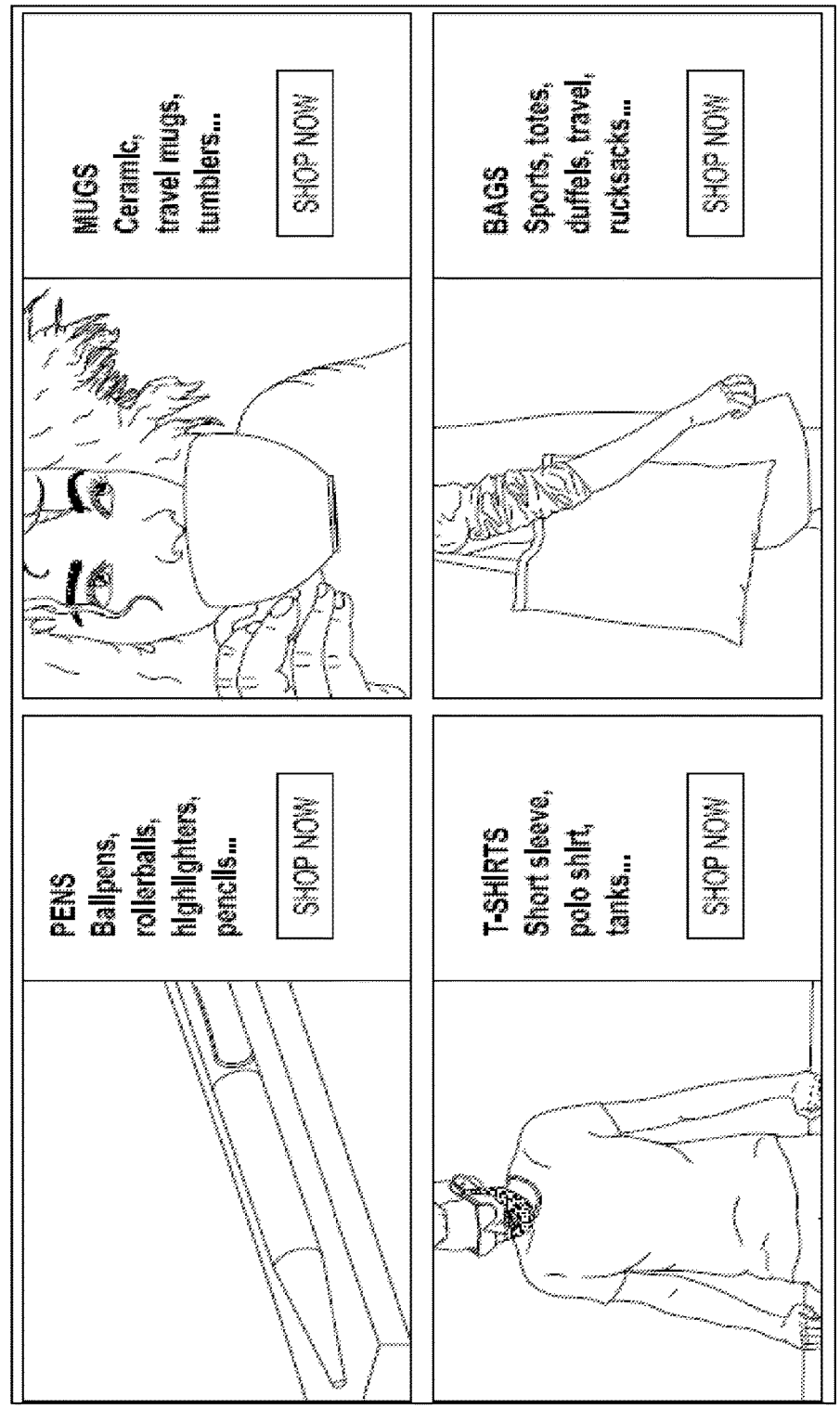
FIG. 7 depicts another embodiment of a website displaying multiple product images.

FIG. 7 depicts another embodiment of a website displaying multiple product images. The top left product image illustrates a pen, the top right product image illustrates a mug, the bottom left product image illustrates a t-shirt, and the bottom right product image illustrates a bag on sale.

Figure 8:
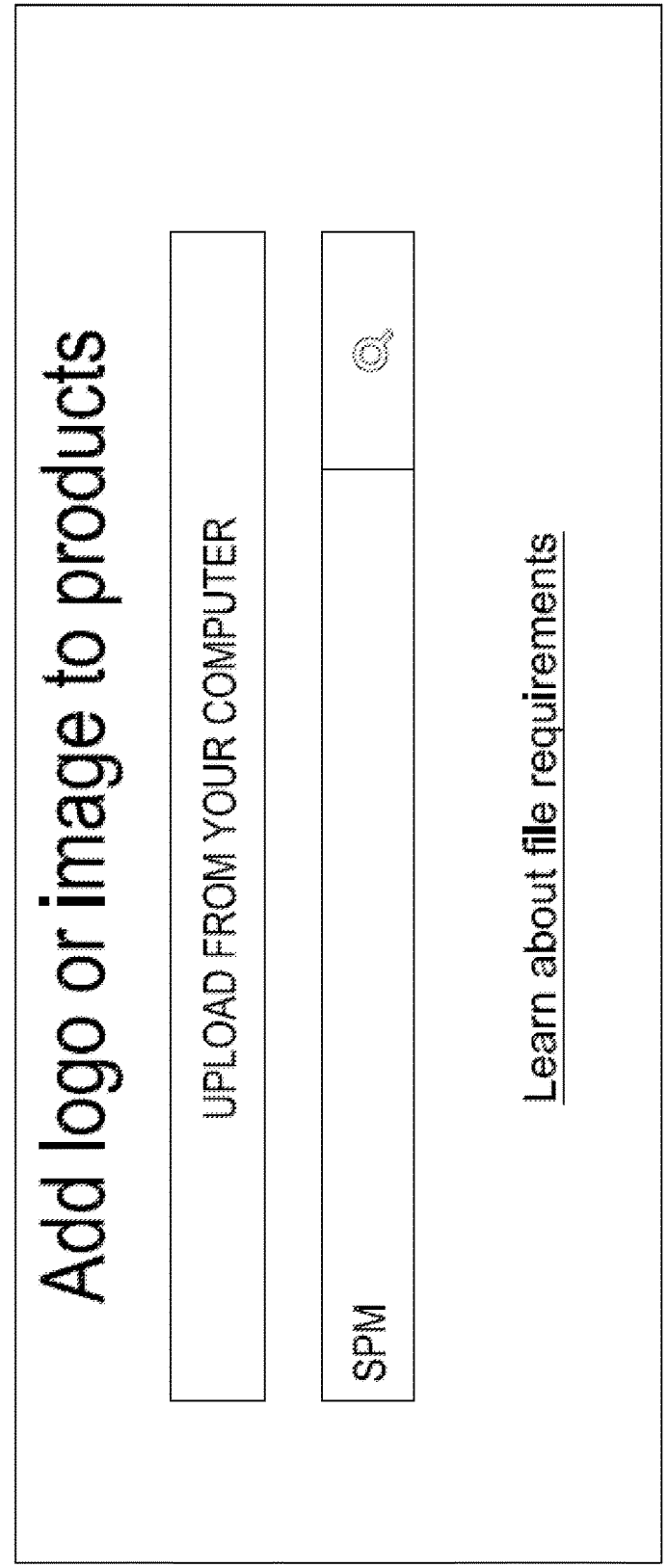
FIG. 8 depicts an embodiment of two options to select an electronic image.

FIG. 8 depicts an embodiment of two options to select an electronic image. In this example, the user has an option to upload an image file from the user's computer. Upon selecting this option, a pop up window can open allowing the user to navigate to the appropriate directory, select the image file, and upload to the product customization and preview system.

Figure 9:
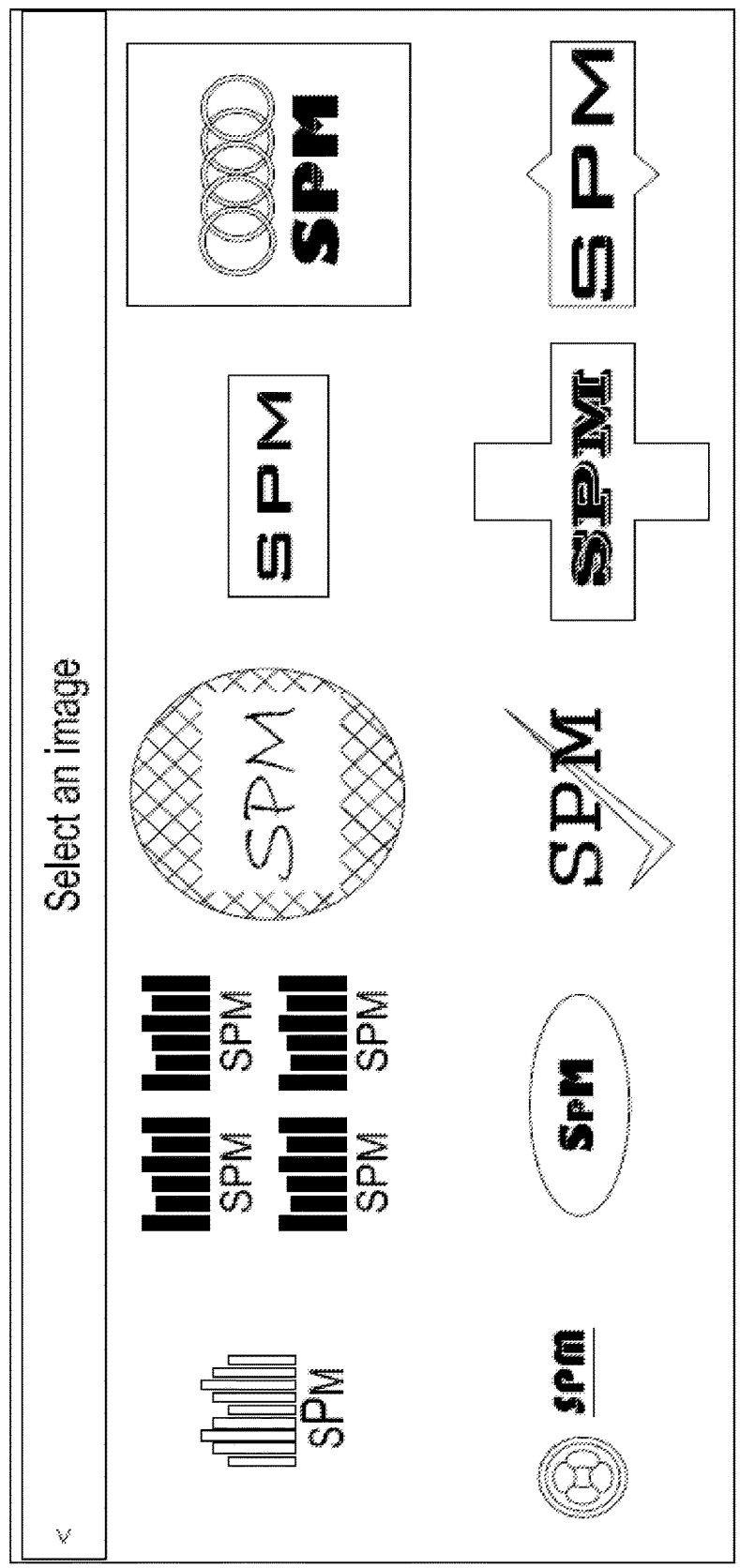
FIG. 9 depicts an embodiment of search results from keyword searching for logo images.

Alternatively, the user can input keywords to search for matching logo images. FIG. 9 depicts an embodiment of search results from keyword searching for logo images. For the keyword "SPM", these are the search results. The user can select an image to be superimposed onto the product image.

Figure 10:
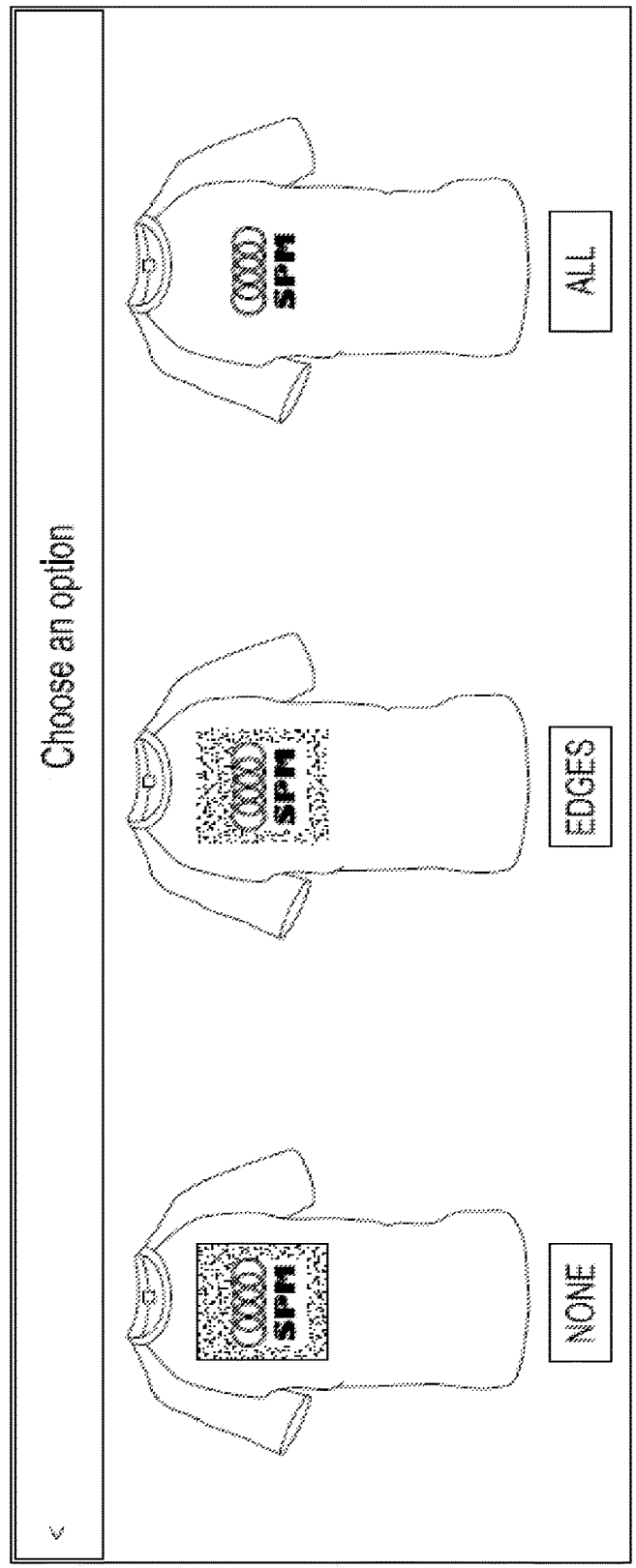
FIG. 10 depicts an embodiment of three recommendations with three different types of logo image modifications for the user to select.

FIG. 10 depicts an embodiment of three recommendations with three different types of logo image modifications for the user to select. On the left is the first modification type where the logo image is superimposed onto the product image. In the middle, the second modification type is shown where the outer edges are removed. On the right, the third modification type is shown where the outer edges and the background are removed.

Figure 11:
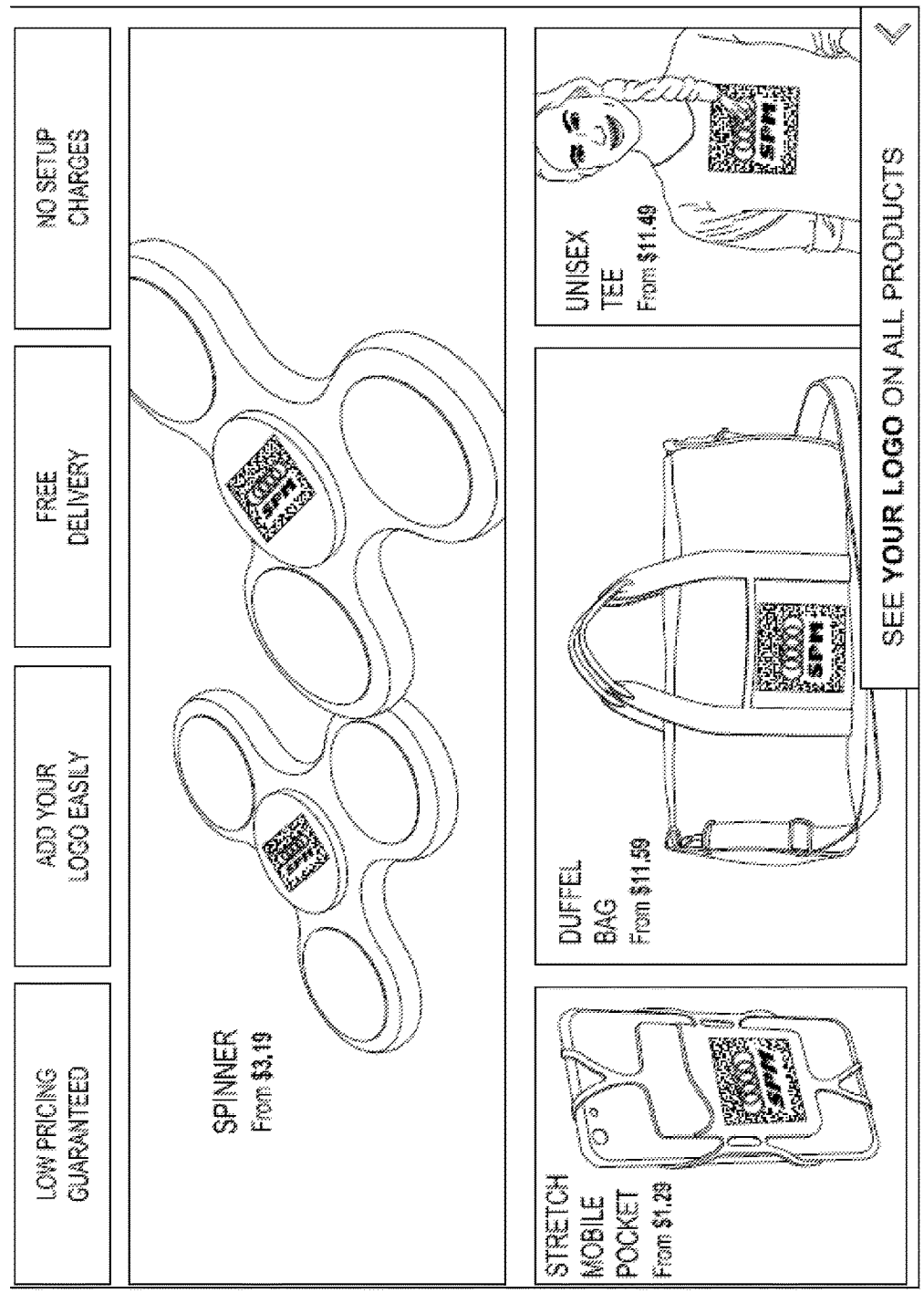
FIG. 11 depicts an embodiment of product images with logo images superimposed based on the first modification type.

FIG. 11 depicts an embodiment of product images with logo images superimposed based on the first modification type. As shown, the logo images are superimposed onto the product images. The edges and background color remain.

The product customization and preview system can modify the pictures to match with characteristics of the photograph. For example, the canvas of the left purple spinner and the mobile device cover are at an angle, and thus the logo image is tilted to match with the perspective of the product image. The contour of the t-shirt and the hair over the shirt are taken into consideration for the t-shirt product image, as shown in FIG. 11.

Here, the user has the option to share this branded store with another. The branded store can comprise the electronic images superimposed onto the product images. This branded store can be shared to a client, customer, partner, friend, and any other person or entity.

Figure 12:
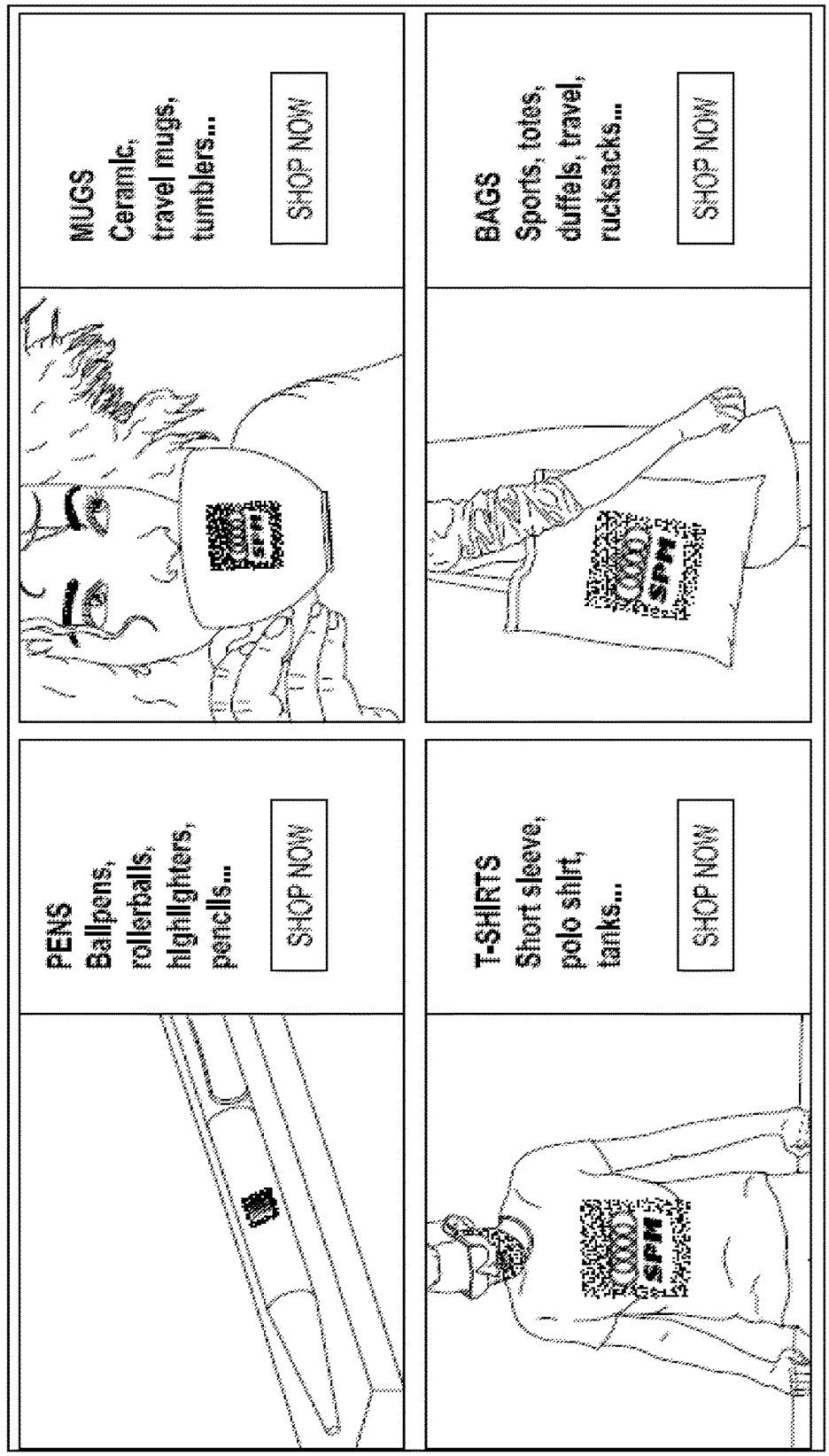
FIG. 12 depicts an embodiment of product images with logo images superimposed based on the second modification type.

FIG. 12 depicts an embodiment of product images with logo images superimposed based on the second modification type. The logo images are superimposed onto the product images. The edges are removed but the background color remains. The logo images are stretched to match the curved contour of the pen on the top right and the mug on the top right.

Figure 13:
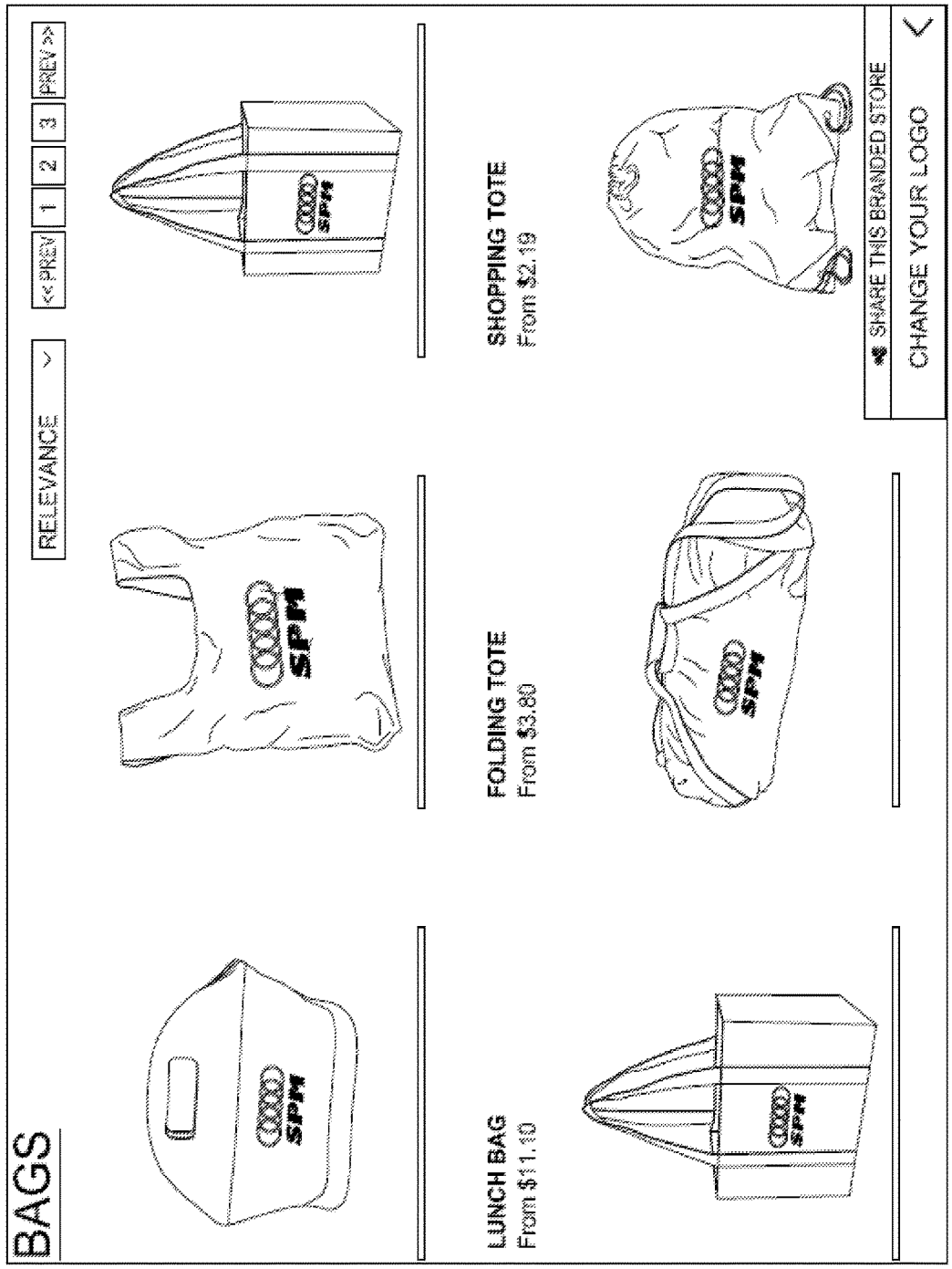
FIG. 13 depicts an embodiment of product images with logo images superimposed based on the third modification type.

FIG. 13 depicts an embodiment of product images with logo images superimposed based on the third modification type. As shown, the logo images are superimposed onto the product images. The edges and background color are both removed. The logo images are stretched in some portions to match the wrinkles in the yellow bag on the top middle and the red bag on the bottom right.

Some Embodiments

A Uniform Resource Locator (URL) can comprise a web address and/or a reference to a web resource that is stored on a database and/or a server. The URL can specify the location of the resource on a computer and/or a computer network. The URL can comprise a mechanism to retrieve the network resource. The source of the network resource can receive a URL, identify the location of the web resource, and transmit the web resource back to the requestor. A URL can be converted to an IP address, and a Doman Name System (DNS) can look up the URL and its corresponding IP address. URLs can be references to web pages, file transfers, emails, database accesses, and other applications. The URLs can comprise a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can comprise data sent from a website and/or stored on a user's computer. This data can be stored by a user's web browser while the user is browsing. The cookies can comprise useful information for websites to remember prior browsing information, such as a shopping cart on an online store, clicking of buttons, login information, and/or records of web pages or network resources visited in the past. Cookies can also comprise information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

For purposes of this application, certain aspects, advantages, and novel features of the invention are described herein. It is to be understood that not necessarily all such advantages can be achieved in accordance with any particular embodiment of the invention. Thus, for example, those skilled in the art will recognize that the invention can be embodied or carried out in a manner that achieves one advantage or group of advantages as taught herein without necessarily achieving other advantages as can be taught or suggested herein.

Although several embodiments, examples, and illustrations are disclosed herein, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments can be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "can," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

What is claimed is:

1. A computer-implemented method for processing a composite preview image based on characteristics of a canvas of a product and characteristics of an electronic image, wherein the method comprises:

retrieving, by the computer system, a product image from a product image database;

transmitting, by the computer system, first display data to a user device for displaying the product image on a webpage or application page on the user device;

receiving, by the computer system, a request from the user device to superimpose a logo onto the product image;

receiving, by the computer system, one or more keywords from a user device for generating a search query to search for one or more electronic images associated with the one or more keywords;

generating and transmitting, by the computer system, an API call to a third-party search engine to conduct a search on one or more third-party electronic image databases for the one or more electronic images associated with the one or more keywords;

receiving, by the computer system, search results from the third-party search engine in response to the API call, wherein the search results comprise the one or more electronic images from the one or more third-party databases and one or more URLs to the one or more electronic images;

transmitting, by the computer system, the search results associated with the one or more keywords to the user device for display on the webpage or application page;

receiving, by the computer system, a user selection of the logo among the one or more electronic images from the search results;

accessing, by the computer system, the user-selected logo from the one or more third-party electronic image databases using the one or more URLs;

automatically modifying, by the computer system, the accessed logo, wherein modifying the accessed logo comprises:

identifying on the product image one or more canvases on the product for superimposing the accessed logo on the one or more canvases;

analyzing the one or more canvases to determine a perspective, curvature, color, size, material, and edges of the one or more canvases;

dynamically removing the edges of the accessed logo;

dynamically adjusting a size of the accessed logo based at least in part on the determined size of the one or more canvases such that the size of the accessed logo substantially matches or is at least smaller than the size of the one or more canvases;

dynamically determining a type of ink for physically printing the accessed logo on the product based at least in part on the determined material of the one or more canvases, wherein the determined type of ink comprises a range of available colors;

dynamically adjusting at least one color of the accessed logo based at least in part on the range of available colors for the determined type of ink and the determined color of the one or more canvases;

dynamically stretching one or more pixels of the accessed logo based at least in part on the determined curvature of the one or more canvases; and dynamically rotating the accessed logo based at least in part on the determined perspective of the one or more canvases such that a perspective of the accessed logo substantially matches the determined perspective of the one or more canvases;

superimposing, by the computer system, the modified logo onto the product image to create a preview image; and transmitting, by the computer system, second display data to the user device for displaying the preview image on the webpage or application page, wherein the computer system comprises a computer processor and an electronic storage medium.

2. The computer-implemented method of claim 1, wherein the method further comprises:

receiving, by the computer system, a request for a third-party website;

accessing, by the computer system, a plurality of third-party product images of a plurality of third-party products associated with the third-party website, wherein each of the plurality of third-party products comprises a canvas;

automatically modifying, by the computer system, the accessed logo for each of the plurality of third-party product images associated with the third-party website, wherein modifying the logo for each of the plurality of third-party product images comprises:

dynamically adjusting at least one color of the accessed logo for each of the plurality of third-party product images;

dynamically stretching the accessed logo for each of the plurality of third-party product images based at least in part on a curvature of the canvas of each of the plurality of third-party products; and dynamically rotating the accessed logo for each of the plurality of third-party product images such that a perspective of the accessed logo substantially matches a perspective of each of the plurality of third-party product images;

superimposing, by the computer system, the modified logo onto each of the plurality of third-party product images to create a plurality of preview images associated with the third-party website; and transmitting, by the computer system, third display data to the user device for displaying the plurality of preview images associated with the third-party website.

3. The computer-implemented method of claim 2, wherein automatically modifying, by the computer system, the accessed logo for each of the plurality of third-party product images further comprises removing edges of the logo.

4. The computer-implemented method of claim 2, wherein automatically modifying, by the computer system, the accessed logo for each of the plurality of third-party product images further comprises removing a background of the logo.

5. The computer-implemented method of claim 1, wherein the logo comprises a company logo and/or company title.

6. The computer-implemented method of claim 1, wherein the automatically modifying, by the computer system, the accessed logo is based at least in part on a user profile that comprises previous user modifications.

7. The computer-implemented method of claim 1, wherein the automatically modifying the accessed logo is performed based at least in part on a preconfigured template.

8. The computer-implemented method of claim 1, wherein the automatically modifying the accessed logo is based at least in part on a user profile.

9. The computer-implemented method of claim 1, further comprising generating, by the computer system, a vector print ready file of the modified logo that can be used by a printer to print the modified logo onto the product.

10. The computer-implemented method of claim 9, wherein the vector print ready file provides instructions for the type of ink to use when printing the modified logo onto the product.

11. The computer-implemented method of claim 1, further comprising generating, by the computer system, a vector print ready file of the preview image.

12. The computer-implemented method of claim 11, wherein the vector print ready file comprises instructions for a 3D printer to print the product with the modified logo printed on the canvas of the product.

13. The computer-implemented method of claim 1, further comprising:

receiving, by the computer system, a user request to share the preview image with another user device; and transmitting, by the computer system, the preview image to the another user device.

14. The computer-implemented method of claim 1, wherein the preview image comprises a rasterized image file.

15. The computer-implemented method of claim 1, wherein the preview image comprises a vectorized image file.

16. The computer-implemented method of claim 1, further comprising offering, by the computer system, the product with the preview image to the user for sale.

17. The computer-implemented method of claim 1, further comprising generating another preview image for another product image retrieved from a third-party product image database separate from the product image database by applying one or more modifications to the another product image based at least in part on the logo modified for the preview image.

18. The computer-implemented method of claim 1, wherein dynamically adjusting the at least one color of the accessed logo comprises applying a color filter to a background color of the accessed logo.

19. The computer-implemented method of claim 1, wherein dynamically adjusting the at least one color of the accessed logo comprises making a background of the accessed logo transparent.

* * * * *

UNITED STATES PATENT AND TRADEMARK OFFICE
CERTIFICATE OF CORRECTION

PATENT NO. : 10,157,408 B2  
APPLICATION NO. : 15/662065  
DATED : December 18, 2018  
INVENTOR(S) : Martin Roy Varley Page 1 of 1

It is certified that error appears in the above-identified patent and that said Letters Patent is hereby corrected as shown below:

On the Title Page

Item (54), Line 1, under Title, change "METHOD," to --METHODS,--.

In the Specification

In Column 1, Line 1, change "METHOD," to --METHODS,--.

In Column 23, Line 15 (Approx.), change "inkjet)" to --inkjet).--.

In the Claims

In Column 26, Line 67, Claim 1, change "colors:" to --colors;--.

Signed and Sealed this  
Sixth Day of August, 2019

Andrei Iancu  
*Director of the United States Patent and Trademark Office*